(12) United States Patent
Polzin et al.

(10) Patent No.: US 11,679,821 B2
(45) Date of Patent: Jun. 20, 2023

(54) PIVOTING CAB FAIRING

(71) Applicant: PACCAR Inc, Bellevue, WA (US)

(72) Inventors: Jon David Polzin, Kenmore, WA (US); Steven J. Schuh, Renton, WA (US)

(73) Assignee: PACCAR Inc, Bellevue, WA (US)

( * ) Notice: Subject to any disclaimer, the term of this patent is extended or adjusted under 35 U.S.C. 154(b) by 247 days.

(21) Appl. No.: 17/114,366

(22) Filed: Dec. 7, 2020

(65) Prior Publication Data

US 2022/0177056 A1 Jun. 9, 2022

(51) Int. Cl.
*B62D 35/00* (2006.01)
*F15D 1/00* (2006.01)
*F15D 1/14* (2006.01)

(52) U.S. Cl.
CPC .......... *B62D 35/001* (2013.01); *F15D 1/003* (2013.01); *F15D 1/14* (2013.01)

(58) Field of Classification Search
CPC .......... B62D 35/001; F15D 1/003; F15D 1/14
See application file for complete search history.

(56) References Cited

U.S. PATENT DOCUMENTS

| 3,008,116 | A | * | 11/1961 | Blanchenot | .......... | H01R 13/625 |
| | | | | | | 439/317 |
| 3,611,514 | A | * | 10/1971 | Wit | ........................ | G09F 3/0305 |
| | | | | | | 292/322 |
| 4,156,543 | A | | 5/1979 | Taylor et al. | | |
| 4,904,015 | A | | 2/1990 | Haines | | |
| 6,428,084 | B1 | * | 8/2002 | Liss | ........................ | B62D 53/06 |
| | | | | | | 296/180.1 |
| 6,846,035 | B2 | * | 1/2005 | Wong | .................... | B62D 35/001 |
| | | | | | | 296/180.1 |
| 7,374,229 | B1 | | 5/2008 | Noll et al. | | |
| 2003/0227194 | A1 | * | 12/2003 | Farlow | ................ | B62D 35/001 |
| | | | | | | 296/180.4 |
| 2009/0184539 | A1 | * | 7/2009 | Pursley | ................ | B62D 35/001 |
| | | | | | | 296/180.2 |
| 2010/0072779 | A1 | | 3/2010 | Pfaff | | |
| 2020/0307724 | A1 | * | 10/2020 | Burrows | .............. | B62D 35/001 |
| 2021/0070378 | A1 | * | 3/2021 | Duncanson | .......... | B62D 35/001 |

FOREIGN PATENT DOCUMENTS

| WO | WO 2016/032421 A1 | 3/2016 |
| WO | WO 2021/053610 A1 | 3/2021 |

* cited by examiner

*Primary Examiner* — Lori L Lyjak
(74) *Attorney, Agent, or Firm* — Seed IP Law Group LLP

(57) ABSTRACT

The present disclosure is directed to a rotatable fairing panel at a rear end of a sleeper cab. The rotatable fairing panel covers an opening between a trailer attached to a vehicle and the sleeper cab of the vehicle. The rotatable fairing panel has a closed position and an opened position. At least one locking assembly locks the rotatable fairing panel in place when in the closed position. The at least one locking assembly is configured to be unlocked by a user such that the rotatable fairing panel may be rotated from the closed position to the opened position such that a user may access the opening between the trailer attached to the vehicle and the sleeper cab of the vehicle. The at least one locking assembly automatically locks when the user rotates the rotatable fairing panel into the closed position.

20 Claims, 21 Drawing Sheets

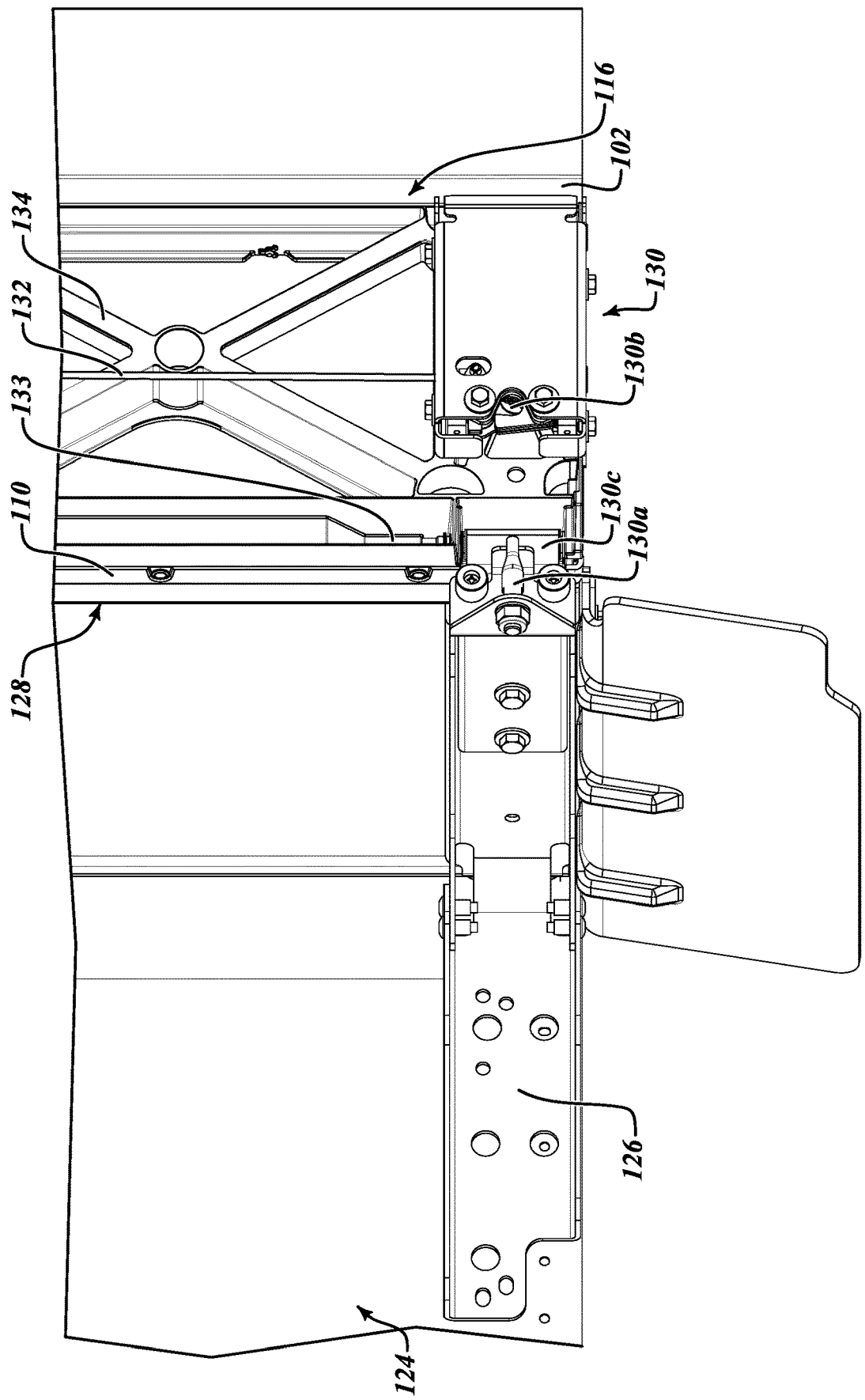

PIVOTING CAB FAIRING

BACKGROUND

Technical Field

The present disclosure is directed to a fairing of a vehicle that is rotatable between a first position (e.g., closed position) and a second position (e.g., an opened position).

Description of the Related Art

Generally, vehicles such as cars, trucks, semi-trucks, watercraft and aircraft have conventional fairing panels along external surfaces of the vehicle. The conventional fairing panels are mounted to the vehicle by either fasteners or welding such that the conventional fairing panels are in a single fixed position. In other words, the conventional fairing panels do not articulate, move, or rotate.

While the conventional fairing panels provide the vehicle with external surfaces that are aerodynamic, reducing drag and increasing fuel efficiency, a user of the vehicle may not have straightforward access to components positioned behind or underneath the conventional fairing panels of the vehicle. For example, the conventional fairing panels may reduce a number of locations along the vehicle at which the user can access the frame of the vehicle, axles of the vehicle, or other components of the vehicle. Alternatively, the user may have to remove the conventional fairing panels to access components behind or underneath the conventional fairing panels. The user may be a mechanic, a driver, an operator, or some other individual maintaining or operating the vehicle having the conventional fairing panels.

BRIEF SUMMARY

Embodiments of the present disclosure at least address providing a rotatable fairing panel at an external surface of a vehicle that maintains the vehicle's aerodynamics when the rotatable fairing panel is in a first position (e.g., a closed position), and that provides a user, a mechanic, an operator, or some other individual maintaining or operating the vehicle easier access to components behind or underneath the rotatable fairing panel when the rotatably fairing panel is in a second position (e.g., an opened position). For example, when the rotatable fairing panel is in the first position (e.g., the closed position), an outer surface of the rotatable fairing panel and the external surfaces of the vehicle define aerodynamic surfaces of the vehicle reducing drag and increasing the vehicles fuel efficiency when in use. However, when the rotatable fairing panel is in the second position (e.g., the opened position), the user or mechanic may readily and easily access components behind the rotatable fairing panel such as components at a rear end of a cab of the vehicle, at a frame of the vehicle, or some other component of the vehicle positioned underneath or behind the rotatable fairing panel.

In some embodiments of the present disclosure, the rotatable fairing panel includes an outer surface and an inner surface opposite to the outer surface. The rotatable fairing panel is hingedly coupled to a fairing portion at a rear end of a cab of the vehicle. A locking component is on the inner surface of the rotatable fairing panel, and the locking component is configured to lock the rotatable fairing panel in the first position (e.g., the closed position). In the first position, the outer surface of the rotatable fairing panel along with the external surfaces of the vehicle define aerodynamic surfaces of the vehicle. When the locking component is unlocked, the rotatable fairing panel is provided a degree-of-freedom such that the rotatable fairing panel may rotate from the first position (e.g., the closed position) to the second position (e.g., the opened position). In the second position (e.g., the opened position), the user or mechanic may access components covered, behind, or underneath the rotatable fairing panel when the rotatable fairing panel is in the first position (e.g., the closed position).

Some embodiments of the present disclosure include a vehicle having a first rotatable fairing panel at a first side of the vehicle, and a second rotatable fairing panel at a second side of the vehicle that is opposite to the first side. The first rotatable fairing panel is hingedly coupled to a first fairing portion at a rear end of the cab and at the first side of the vehicle, and the second rotatable fairing panel is hingedly coupled to a second fairing portion at the rear end of the cab and at the second side of the vehicle.

BRIEF DESCRIPTION OF THE SEVERAL VIEWS OF THE DRAWINGS

In the drawings, identical reference numbers identify similar elements or acts unless the context indicates otherwise. The sizes and relative proportions of the elements in the drawings are not necessarily drawn to scale.

FIG. 3B is a zoomed in view of an embodiment of a second locking assembly in an unlocked state;

DETAILED DESCRIPTION

Figure 1A:
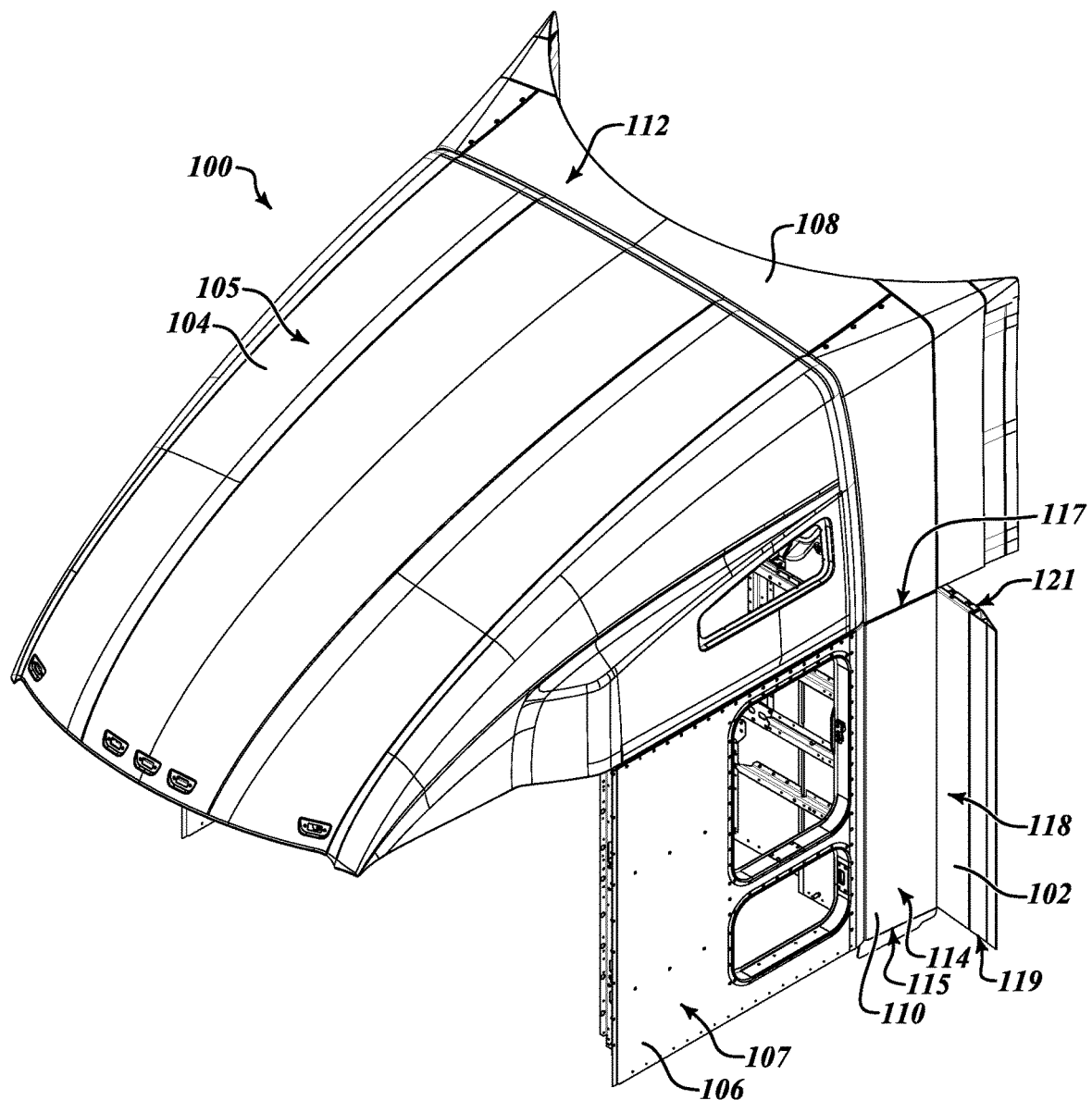
FIG. 1A is perspective view of a sleeper cab having an embodiment of a rotatable fairing panels in an opened position.

In the following description, certain specific details are set forth in order to provide a thorough understanding of various embodiments of the disclosure. However, one skilled in the art will understand that the disclosure may be practiced without these specific details. In other instances, well-known structures and components associated with vehicles such as trucks, cars, construction vehicles, aircraft, watercraft, etc., have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second, third, fourth, etc., does not necessarily imply a ranked sense of order, but rather may only distinguish between multiple instances of an act or structure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms "top," "bottom," "upper," "lower," "vertical," "horizontal," "left," and "right," are used for only discussion purposes based on the orientation of the components in the discussion of the Figures in the present disclosure as follows. These terms are not limiting as to the possible positions explicitly disclosed, implicitly disclosed, or inherently disclosed in the present disclosure.

The term "substantially" is used to clarify that there may be slight differences or variations as for when a surface is coplanar with another surface in the real world, as nothing can be made perfectly equal or perfectly the same. In other words, substantially means that there may be some slight variation in actual practice, and instead, is made within accepted tolerances.

The terms "coplanar" and "flush" are used to define that adjacent surfaces smoothly transition from each other. For example, where a first end of a first surface meets a second end of second surface, the surfaces are substantially coplanar at the first end and the second end. In other words, there is a smooth transition between the first end of the first surface and the second end of the second surface. Further, in some embodiments, other locations further along the first surface and the second surface may not be "coplanar" and "flush" with each other in the traditional sense as well. Alternatively, in some embodiments, other locations further along the first surface and the second surface may be "coplanar" and "flush" with each other in the traditional sense as well.

As used in this specification and the appended claims, the singular forms "a," "an," and "the" include plural referents unless the content clearly dictates otherwise.

The present disclosure is directed to embodiments of a rotatable fairing panel that is at a rear end of a sleeper cab of a vehicle. In at least one embodiment of the present disclosure the rotatable fairing panel is hingedly coupled to a fairing portion, which is coupled to the rear end of the sleeper cab. The rotatable fairing panel has a first position (e.g., a closed position) and a second position (e.g., an opened position). When the rotatable fairing panel is in the first position (e.g., the closed position), an outer surface of the fairing panel along with external surfaces of the fairing portion, the sleeper cab, and the vehicle define at least one aerodynamic surface. When the rotatable fairing panel is in the second position (e.g., the opened position), the rotatable fairing panel is transverse to the external surfaces of the fairing portion, the sleeper cab, and the vehicle. In other words, the outer surface of the rotatable fairing panel is substantially coplanar and flush with external surfaces of the fairing portion, the sleeper cab, and the vehicle. When the rotatable fairing panel is in the second position (e.g., the opened position), the rotatable fairing panel provides an individual (e.g., a user, an operator, a driver, a mechanic, a maintenance employee, etc.) with access to a frame of the vehicle, the rear end of the sleeper cab, or other components of the vehicle that may be covered, behind, or underneath the rotatable fairing panel when in the first position (e.g., the closed position).

The embodiments of the rotatable fairing panel include a locking assembly on an inner surface of the rotatable fairing panel. The locking assembly is configured to lock the rotatable fairing panel in the closed position when the vehicle is being driven. Furthermore, when the locking assembly is unlocked, the rotatable fairing panel is rotatable between the first position (e.g., the closed position) and the second position (e.g., the opened position). In other words, when the locking assembly is unlocked, the rotatable fairing panel is provided a degree-of-freedom to hingedly rotate between the first position (e.g., the closed position) and the second position (e.g., the opened position).

Figure 1B:
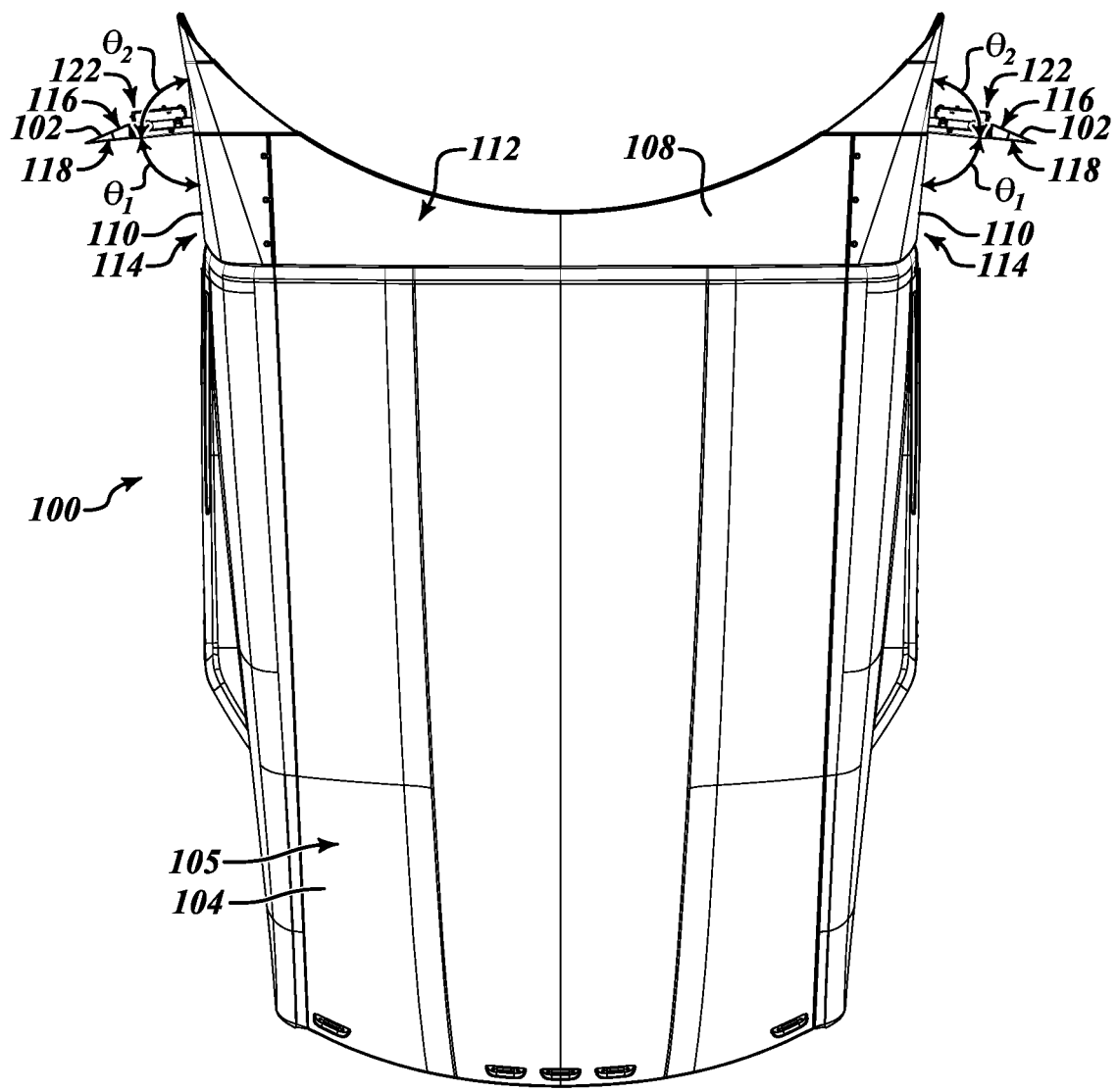
FIG. 1B is a top-plan view of the sleeper cab having the embodiment of the rotatable fairing panels in the opened position as shown in FIG. 1A.
Figure 1C:
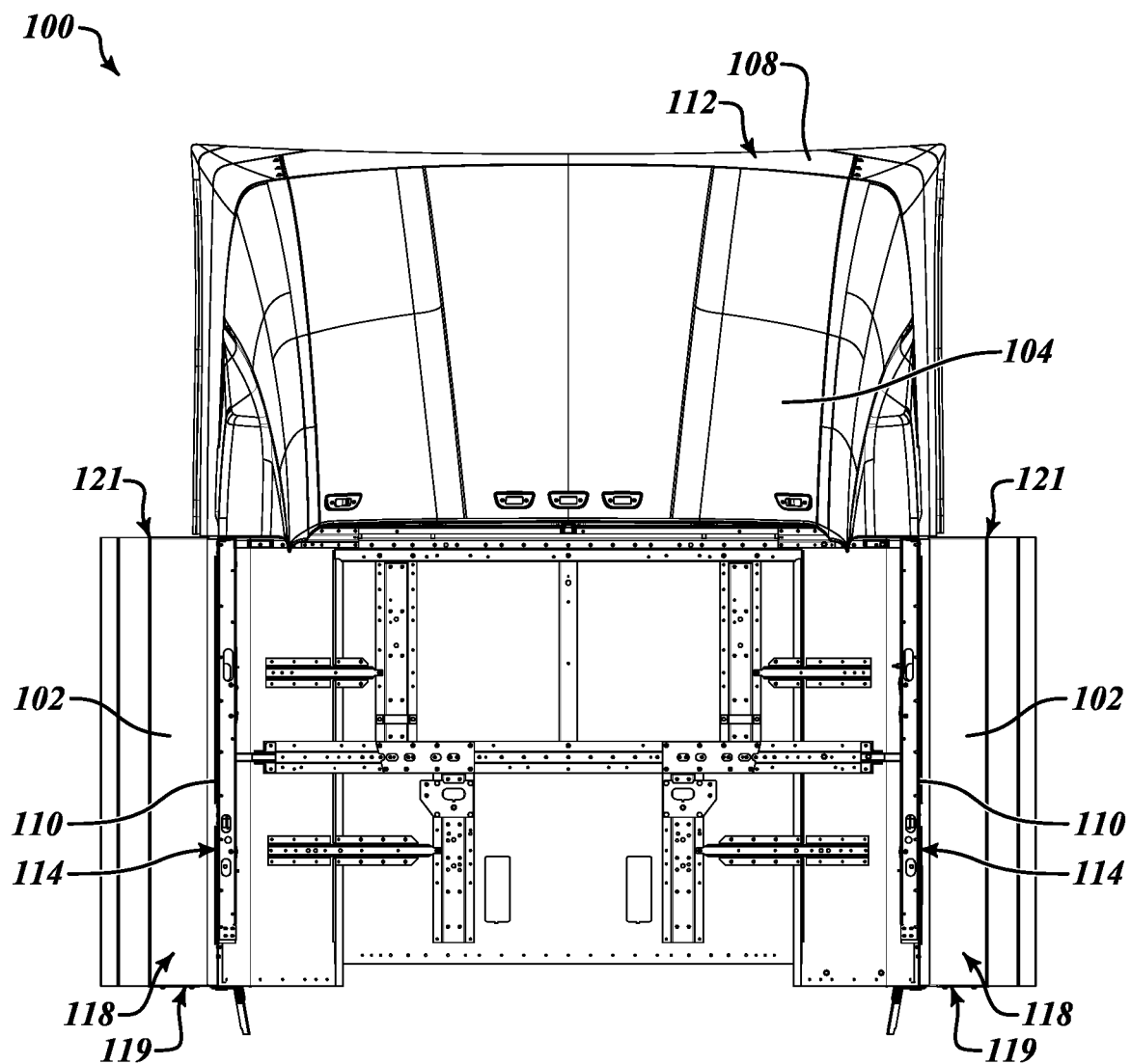
FIG. 1C is a front view of the sleeper cab having the embodiment of the rotatable fairing panels in the opened position as shown in FIGS. 1A and 1B.
Figure 1D:
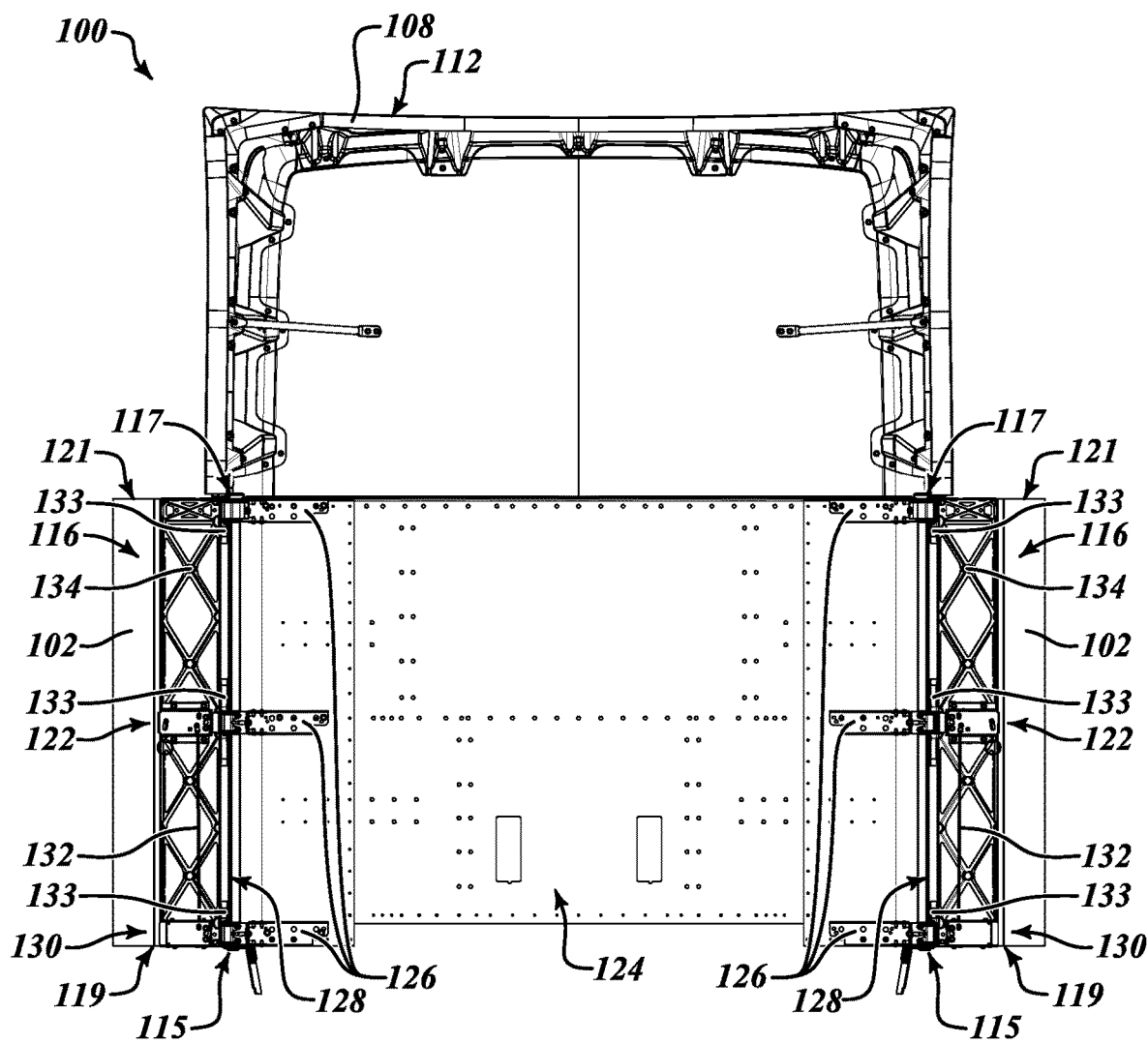
FIG. 1D is a rear view of the sleeper cab having the embodiment of the rotatable fairing panels in the opened position as shown in FIGS. 1A-1C.
Figure 1E:
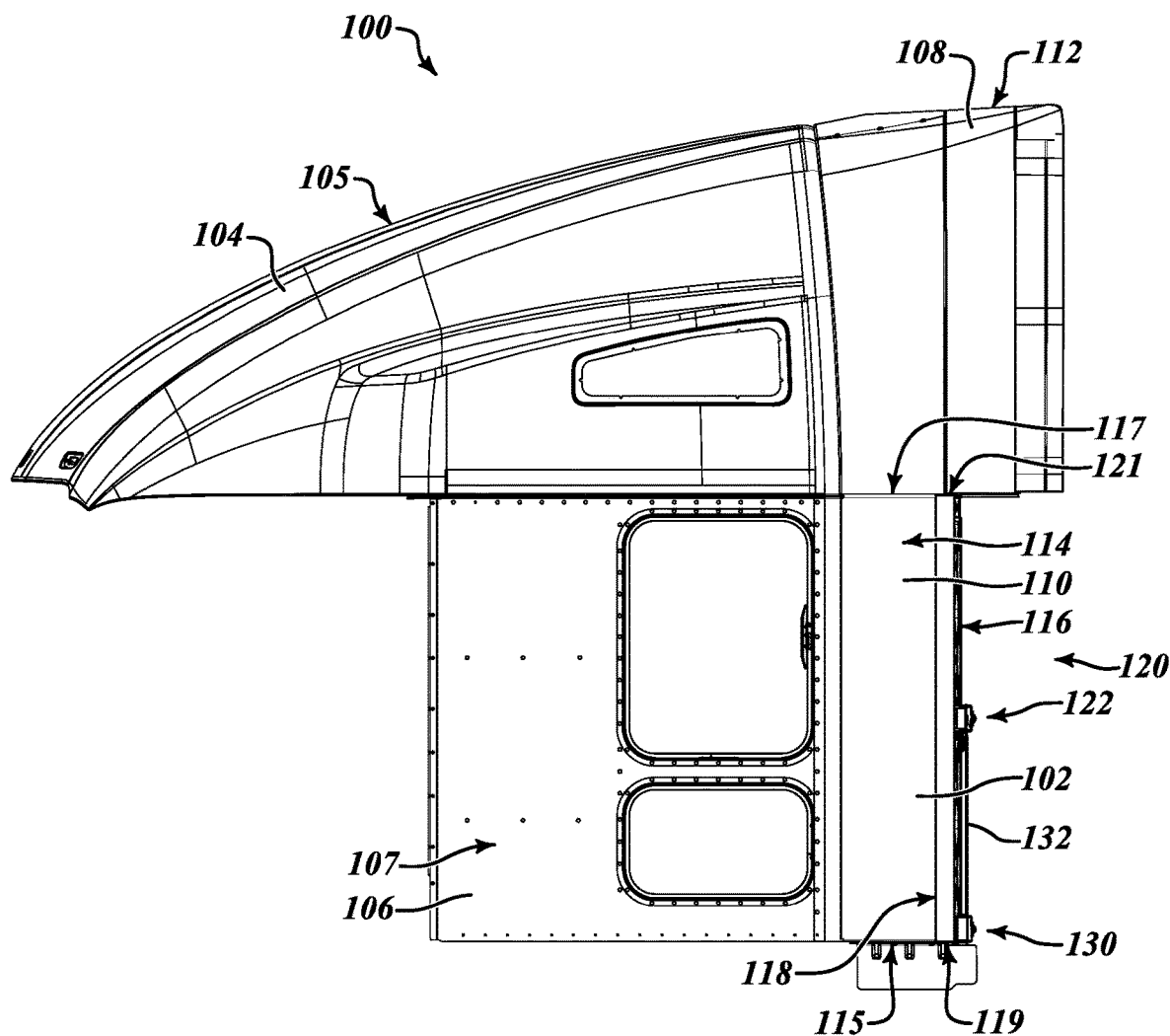
FIG. 1E is a right-side view of the sleeper cab having the embodiment of the rotatable fairing panels in the opened position as shown in FIGS. 1A-1D.
Figure 1F:
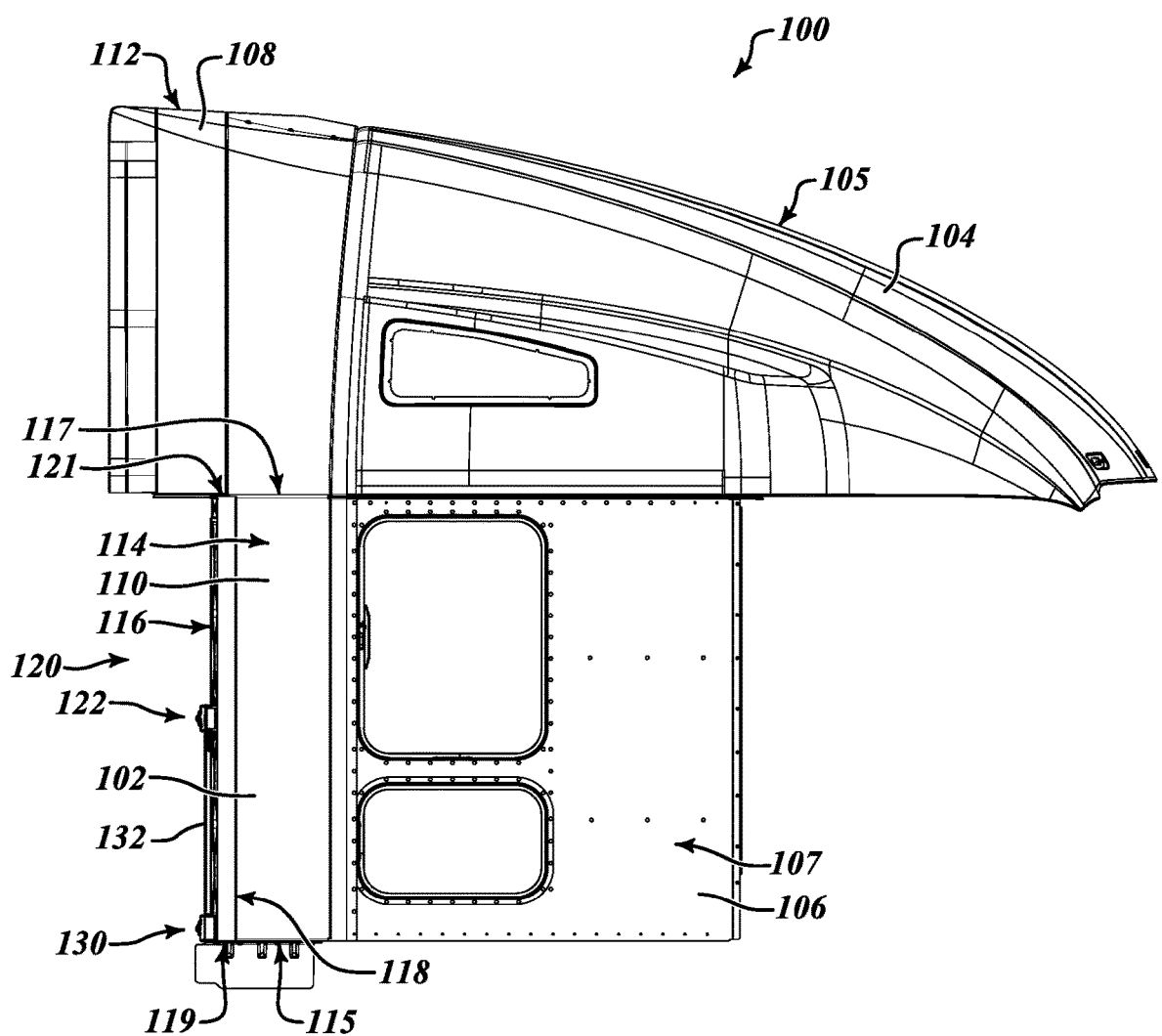
FIG. 1F is a left-side view of the sleeper cab having the embodiment of the rotatable fairing panels in the opened position as shown in FIGS. 1A-1E.
Figure 1G:
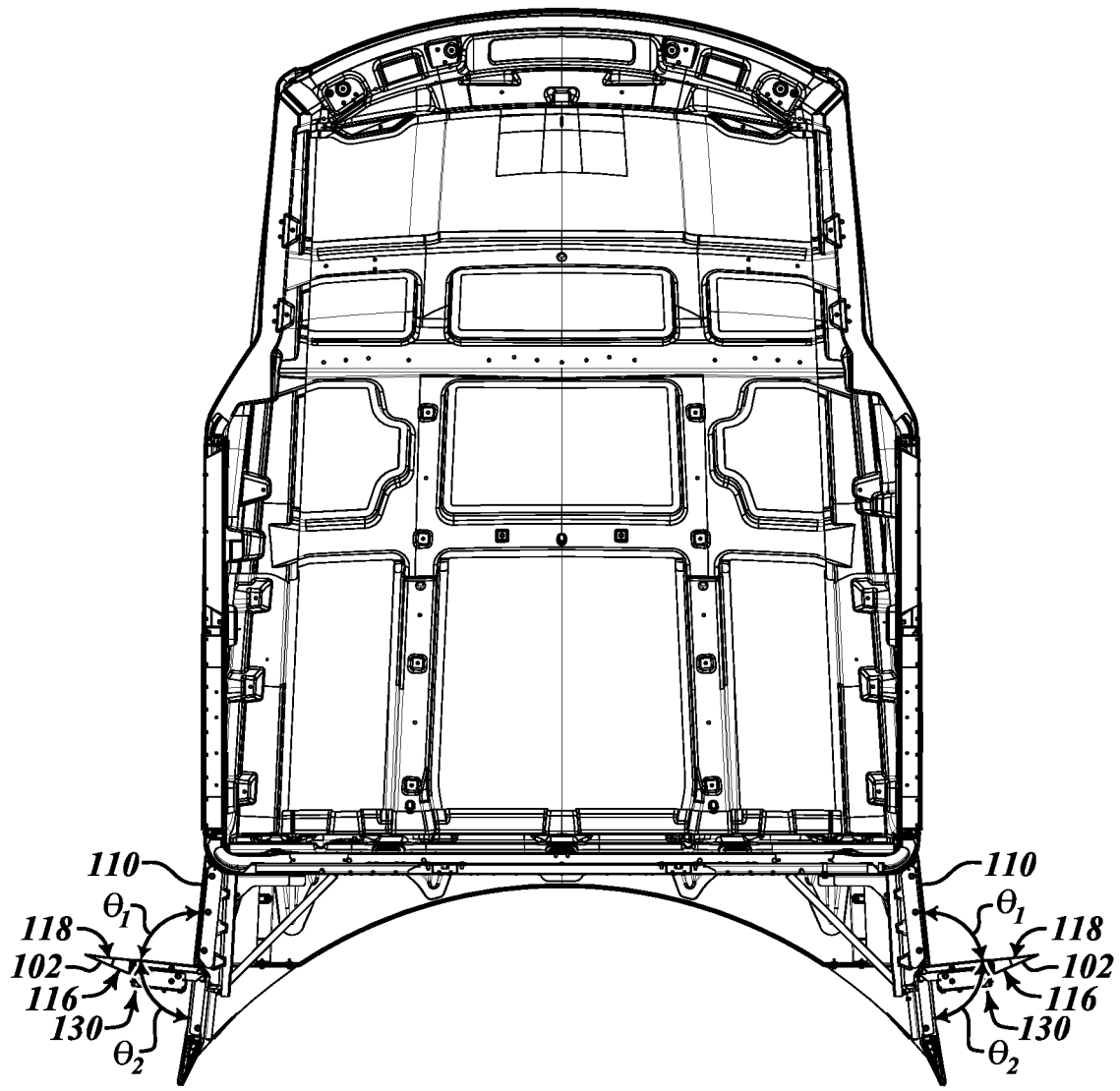
FIG. 1G is a bottom-plan view of the sleeper cab having the embodiment of the rotatable fairing panels in the opened position as shown in FIGS. 1A-1F.
Figure 1H:
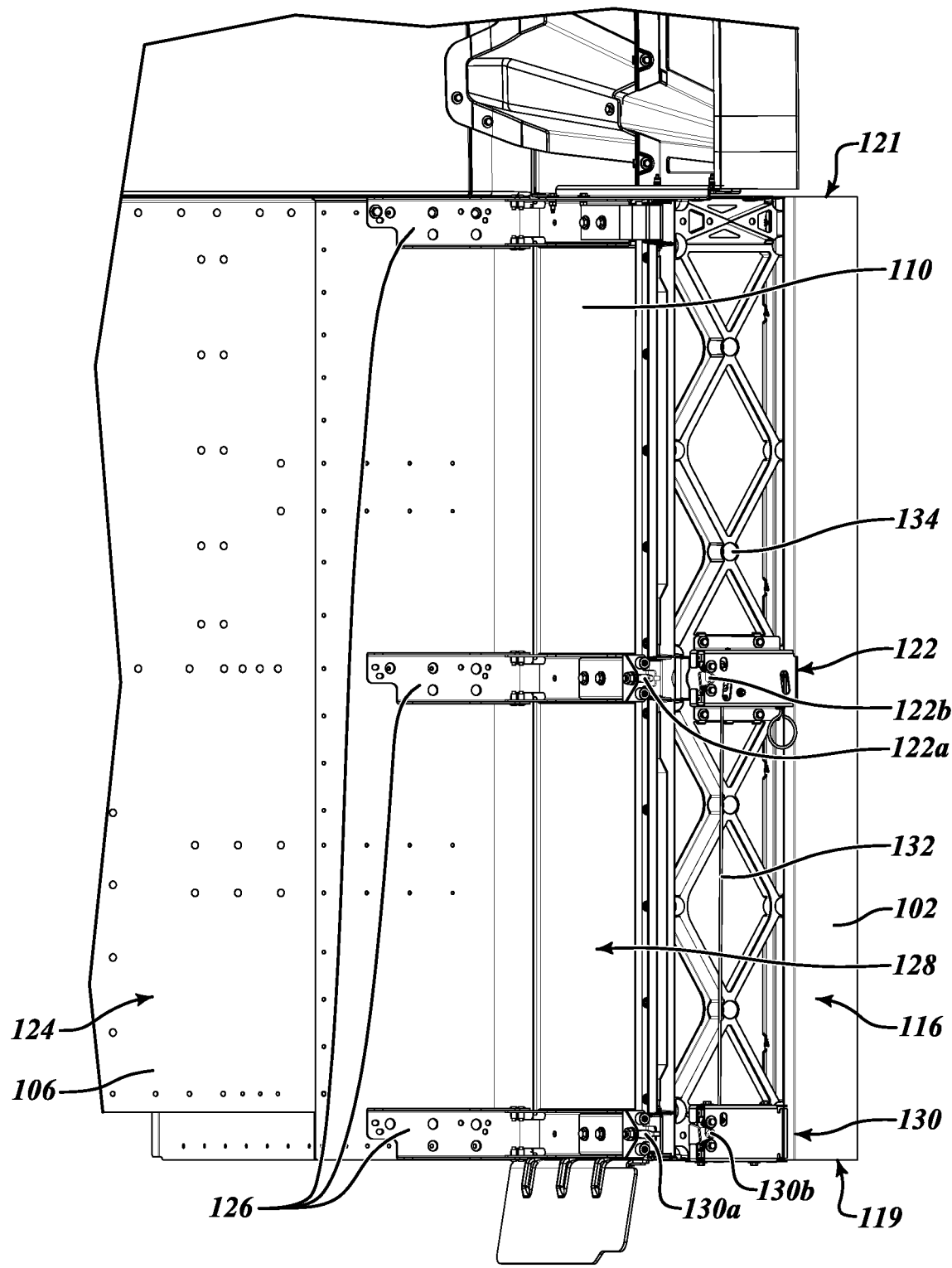
FIG. 1H is a zoomed in rotated view of the embodiment of the rotatable fairing panel on the right-hand side of FIG. 1D in the opened position as shown in FIGS. 1A-1G.

FIG. 1A is directed to a perspective view of a sleeper cab 100 of a vehicle (which is not shown) including rotatable fairing panels 102 at a rear end of the sleeper cab 100, at the right-hand side and left-hand side of the sleeper cab 100, and in an opened position. FIG. 1B is a top-plan view of the sleeper cab 100 with the rotatable fairing panels 102 in the opened position. FIG. 1C is front view of the sleeper cab 100 with the rotatable fairing panels 102 in the opened position. FIG. 1D is a rear view of the sleeper cab 100 with the rotatable fairing panels 102 in the opened position. FIG. 1E is a right-side view of the sleeper cab 100 with the rotatable fairing panels 102 in the opened position. FIG. 1F is a left-side view of the sleeper cab 100 with the rotatable fairing panels 102 in the opened position. FIG. 1G is a bottom-plan view of the sleeper cab 100 with the rotatable fairing panels 102 in the opened position. FIG. 1H is a zoomed in rotated view of the rotatable fairing panel 102 on the right-hand-side of the sleeper cab 100.

In some embodiments of the sleeper cab 100, a first rotatable fairing panel 102 is at the right-hand side of the vehicle and a second rotatable fairing panel 102 is at a left-hand side of the vehicle. In some embodiments of the sleeper cab 100, the first rotatable fairing panel 102 is at the right-hand side and the second fairing panel 102 is not present and, instead, is replaced by a fixed fairing panel at the left-hand side of the vehicle. In some embodiments of the sleeper cab 100, the first rotatable fairing panel 102 is not present and, instead, is replaced by a fixed fairing panel and the second fairing panel 102 is at the left-hand side of the vehicle.

The first rotatable fairing panel 102 at the right-hand side of FIGS. 1A-1H and 2A-2I may rotate in a first rotation direction (e.g., a clockwise direction) when viewed in the top-plan view of FIG. 1B, and the second rotatable fairing panel 102 at the left-hand side of FIGS. 1A-1H and 2A-2I may rotate in a second rotation direction (e.g., a counter-clockwise direction) opposite to the first rotation direction when viewed in the top-plan view in FIG. 1B.

For the sake of brevity and simplicity of the present disclosure, the discussion as follows with respect to FIGS. 1A-1H and 2A-2I will only focus on the features of the first rotatable fairing panel 102 on the right-hand side of the sleeper cab 100 as shown in FIGS. 1A-1H. However, it will be readily appreciated that the following discussion with respect to the first rotatable fairing panel 102 on the right-hand side of the sleeper cab 100 applies in the same or similar manner to the second rotatable fairing panel 102 on the left-hand side of the sleeper cab 100 as shown in FIGS. 1A-1H and 2A-2I.

As shown in FIGS. 1A-1G, the sleeper cab 100 includes a first cab portion 104 and a second cab portion 106. The first cab portion 104 is an upper cab portion that is stacked on the second cab portion 106, which is a lower cab portion. The first cab portion 104 is rounded and curved such that the first cab portion 104 has an aerodynamic shape and contributes to the aerodynamics of the vehicle when being driven, and the second cab portion 106 has sidewalls that are substantially vertical such that the second cab portion 106 has an aerodynamic shape and contributes to the aerodynamics of the vehicle when being driven. The first cab portion 104 is coupled to the second cab portion 106 by a plurality of fasteners (e.g., screws, rivets, nuts, bolts, etc.). The first cab portion 104 includes a first external surface 105 and the second cab portion has a second external surface 107.

In some embodiments, the first cab portion 104 and the second cab portion 106 are made a single, continuous material. In some embodiments, the first cab portion 104 and the second cab portion 106 are welded together. In some embodiments, the first cab portion 104 and the second cab portion may be coupled together by a combination of a single, continuous material, welding, and fasteners.

A first fairing portion 108 and a second fairing portion 110 are coupled to the rear end of the sleeper cab. The first fairing portion 108 is coupled to the first cab portion 104 and the second fairing portion 110 is coupled to the second cab portion 106. The first and second fairing portions 108, 110 are coupled to the first and second cab portions 104, 106, respectively, by a plurality of fasteners (e.g., screws, rivets, nuts, bolts, etc.). The first and second fairing portions 108, 110 are separate and distinct portions.

In some embodiments, the first and second fairing portions 108, 110 may be welded to the first and second cab portions 104, 106. In some embodiments, the first and second fairing portions 108, 100 may be coupled to the first and second cab portions 104, 106 by a combination of welding and fasteners. In some embodiments, the first and second fairing portions 108, 110 and the first and second cab portion 104, 106 are made of a single, continuous material.

In some embodiments, the first and second fairing portions 108, 110 are made of a single, continuous material. In some embodiments, the first and second fairing portions may be made of a plurality of portions coupled together by welding, fasteners, or a combination of both.

The first fairing portion 108 is an upper fairing portion that protrudes outward from the first cab portion 104. The first fairing portion 108 includes an external surface 112 that is substantially coplanar and flush with the first external surface 105 of the first cab portion 104 such that the external surfaces 105, 112 of the first cab portion 104 and the first fairing portion 108 define at least one aerodynamic surface. The second fairing portion 110 is a lower fairing portion that protrudes outward from the second cab portion 106. The second fairing portion 106 includes an external surface 114 that is substantially coplanar and flush with the second external surface 107 of the second cab portion 106 such that the external surfaces 107, 114 of the second cab portion 106 and the second fairing portion 110 define at least one aerodynamic surface.

The second fairing portion 110 includes a first end 115 and a second end 117 opposite to and spaced apart from the first end 115. The first end 115 is a lower end of the second fairing portion 110 and the second end 117 is an upper end of the second fairing portion 110. The second end 117 is adjacent to the first fairing portion 108.

The rotatable fairing panel 102 includes a first end 119 and a second end 121 that is opposite to the first end 119. The second end 121 is an upper end that is adjacent to the first fairing portion 108 when the rotatable fairing panel 102 is in a closed position, and the first end 119 is a lower end that is spaced apart from the second end 121. The first end 119 of the rotatable fairing panel 102 is laterally adjacent to the first end 115 of the second fairing portion 110. The second end 121 of the rotatable fairing panel 102 is laterally adjacent to the second end 117 of the second fairing portion 110. The second end 121 is adjacent to the first fairing portion 108 when in the closed position.

As shown in FIG. 1B, the rotatable fairing panel 102 includes an inner surface 116 and an outer surface 118 that is opposite to the inner surface 116. The outer surface 118 is transverse to the external surface 114 of the second fairing portion 110 by an angle $\theta_1$, which in some embodiments is less than or substantially equal to 90-degrees, when the rotatable fairing panel 102 is in the opened position.

In some embodiments, the angle $\theta_1$ may be slightly less than or slightly greater than 90-degrees. In some embodiments, the angle $\theta_1$ may be substantially equal to 75-degrees, substantially equal to 80-degree, substantially equal to 100-degrees, substantially equal to 110-degrees, or some other similar or suitable angle such that a user can pass through an opening 120, which can be more readily seen in FIG. 1F, between a trailer (which is not shown), which is attached to the vehicle, and the sleeper cab 100. The opening 120 will be discussed in further detail with respect to FIGS. 1E and 1F as follows herein.

The rotatable fairing panel 102 is rotatable from the opened position to the closed position and vice versa by a rotation angle $\theta_2$. In some embodiments, the rotation angle $\theta_2$ is substantially equal to 90-degrees.

In some embodiments, the rotation angle $\theta_2$ may be substantially equal to 75-degrees, may be substantially equal to 80-degrees, may be substantially equal to 100-degrees, or may be substantially equal to some other suitable angle that provides clearance for a user to pass through the opening 120, which will be discussed in further detail with respect to FIGS. 1E and 1F.

Figure 3A:
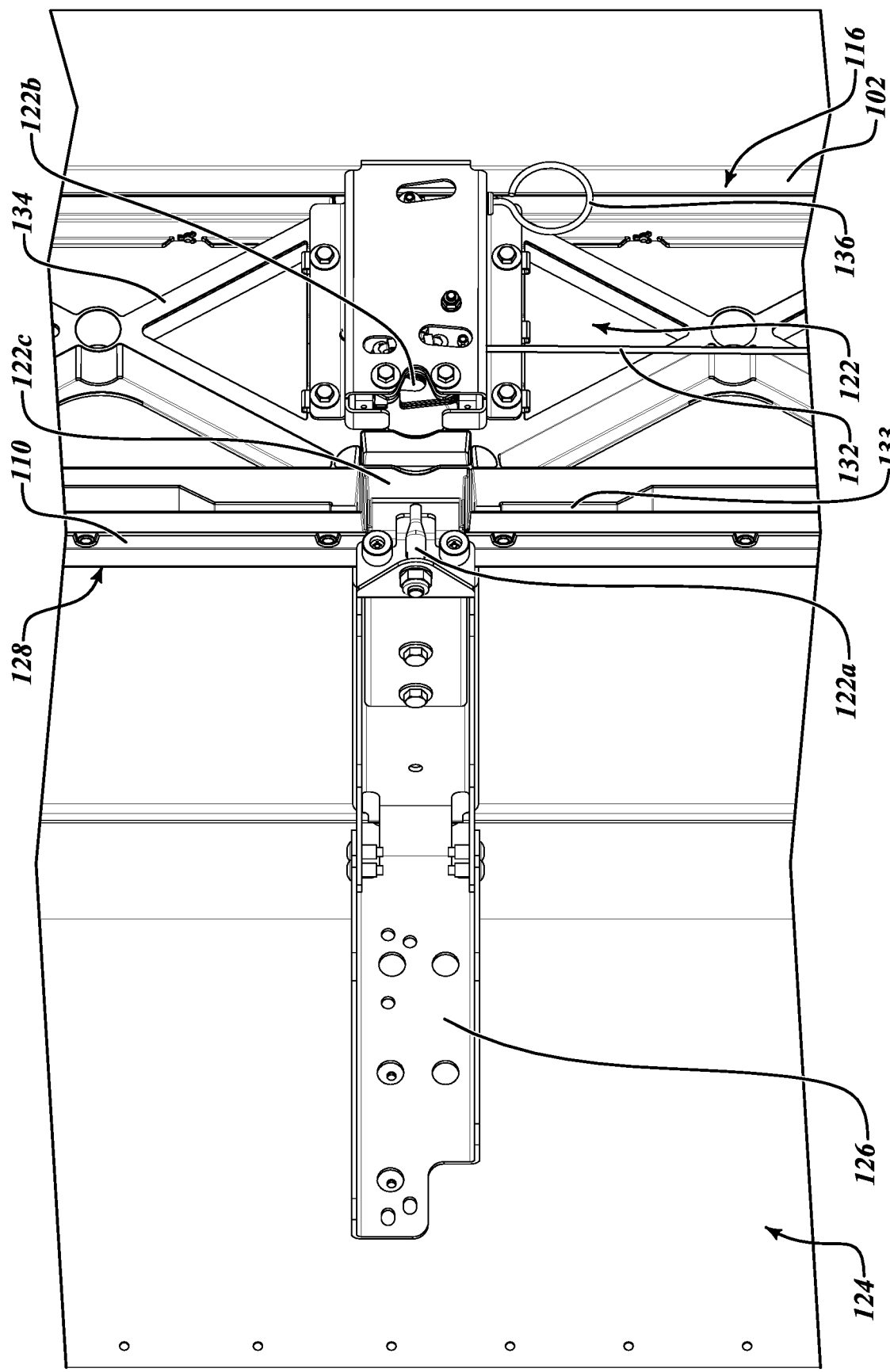
FIG. 3A is a zoomed in view of an embodiment of a first locking assembly in an unlocked state.
Figure 3C:
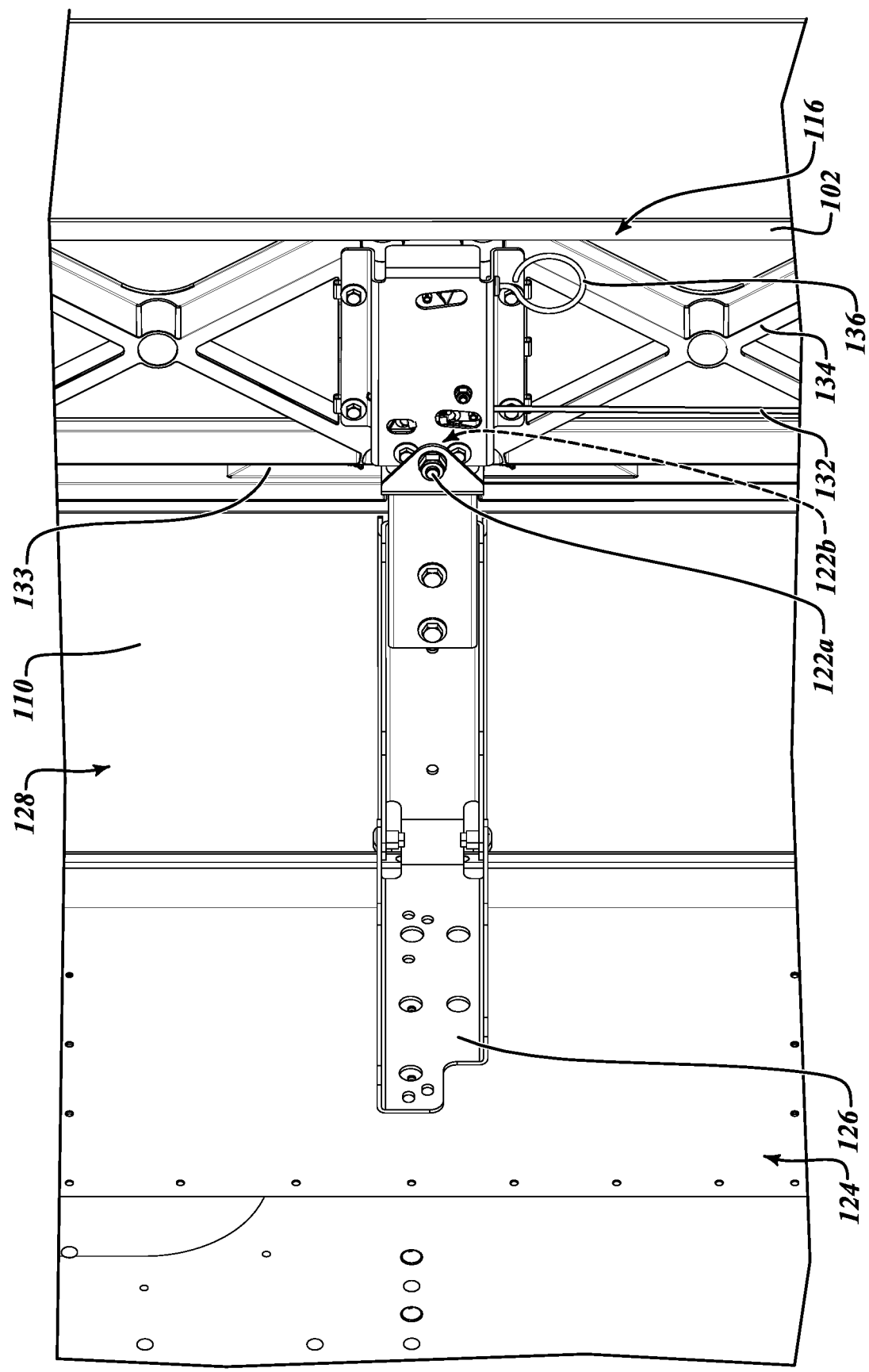
FIG. 3C is a zoomed in view of the embodiment of the first locking assembly in a locked state.

A first locking assembly 122, which can be more readily seen in FIGS. 1H, 3A, and 3C, is at the inner surface 116 of the rotatable fairing panel 102 and at an internal surface 128, which can more readily be seen in FIGS. 1D and 1H, of the second fairing portion 110. The first locking assembly 122 is positioned between the first end 119 and the second end 121. The first locking assembly 122 is at a central region of the inner surface 116 of the rotatable fairing panel 102. The first locking assembly 122 automatically locks when the rotatable fairing panel 102 is rotated or moved into the closed position. The functionality and features of the first locking assembly 122 will be discussed in further detail with respect to FIGS. 1H and 3A-3D as follows herein.

As shown in FIG. 1D, the second fairing portion 110 is coupled to a rear surface 124 of the sleeper cab 100 by a plurality of brackets 126. Each of the plurality of brackets 126 has a first mounting end coupled to the rear surface 124 and a second mounting end coupled to the internal surface 128 of the second fairing portion 110. The first mounting ends of the plurality of brackets 126 are coupled to the rear surface 124 by a plurality of fasteners (e.g., screws, rivets, bolts, nuts, etc.), and the second mounting ends of the plurality of brackets 126 are coupled to the internal surface 128 of the second fairing portion 110 by a plurality of fasteners (e.g., screws, rivets, bolts, nuts, etc.). The plurality of brackets 126 may be L-brackets, strut brackets, or some other type of bracket suitable for coupling the second fairing portion 110 to the rear surface 124 of the sleeper cab 100.

As shown in FIG. 1D, the plurality of brackets 126 includes three brackets. At least the second mounting end of the lowest bracket of the plurality of brackets 126 as shown in FIG. 1D is at the first end 115 (e.g., the lower end) of the second fairing portion 110. At least the second mounting end of the highest bracket of the plurality of brackets 126 as shown in FIG. 1D is at the second end 117 of the second fairing portion 110, and is adjacent to the first fairing portion 108 when the rotatable fairing panel 102 is in the closed position. At least the second mounting end of the central bracket of the plurality of brackets 126 is at a location on the second fairing portion 110 between the first end 115 and the second end 117 of the second fairing portion 110.

In some embodiments, the plurality of brackets 126 may include two brackets, four brackets, five brackets, or any other suitable number of brackets to couple the second fairing portion 110 to the second cab portion 106.

Figure 3D:
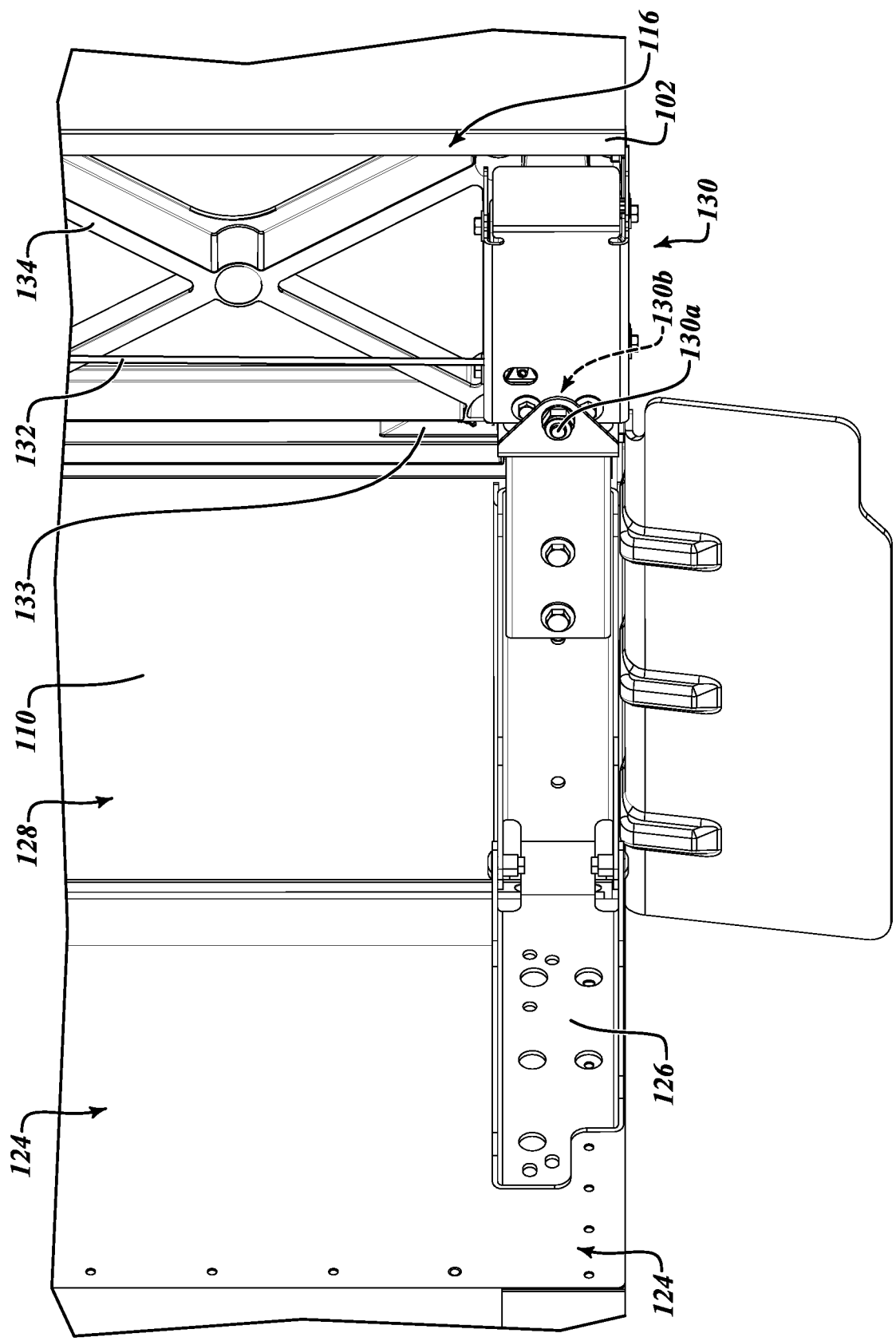
FIG. 3D is zoomed in view of the embodiment of the second locking assembly in a locked state.

A second locking assembly 130, which can be more readily seen in FIGS. 1H, 3B, and 3D, is at the inner surface 116 of the rotatable fairing panel 102 and the internal surface 128 of the second fairing portion 110. The second locking assembly 130 is at the first end 119 of the rotatable fairing panel 102. The second locking assembly 130 is at an end region of the inner surface 116 the rotatable fairing panel 102. The second locking assembly 130 automatically locks when the rotatable panel is moved or rotated into the closed position. The second locking assembly 130 will be discussed in further detail with respect to FIGS. 1H and 3A-3D.

The inner surface 116 of the rotatable fairing panel 102 includes ribs 134 that are utilized to support and assist in coupling the first locking assembly 122 and the second locking assembly 130 to the inner surface 116 of the rotatable fairing panel 102. In some embodiments, the ribs 134 may not be present on the inner surface 116 of the rotatable fairing panel 102.

A translating rod 132 extends from the first locking assembly 122 to the second locking assembly 130. The translating rod 132 is in mechanical cooperation with both the first locking assembly 122 and the second locking assembly 130 such that the first and second locking assemblies 122, 130 unlock at the same time together. For example, when the first locking assembly 122 is unlocked by a user to open the rotatable panel, the translating rod 132 translates an unlocking movement from the first locking assembly 122 to the second locking assembly 130 unlocking the second locking assembly 130 at the same time. Further details with respect to the translating rod will be discussed in further detail with respect to FIGS. 3A-3D.

The first locking assembly 122 between the first end 119 and the second end 121 of rotatable fairing panel 102 along with the second locking assembly 130 provide the rotatable fairing panel 102 with enough rigidity and stiffness such that the rotatable fairing panel 102 does not unintentionally open when the vehicle is being driven. For example, while only either the first or second locking assemblies 122, 130 may be utilized alone without the other present in some alternative embodiments of the rotatable fairing panel 102, having both the first and second locking assemblies 122, 130 as shown in FIG. 1D increases the rigidity and stiffness of the rotatable fairing panel 102 when locked in the closed position as compared to some alternative embodiments of the rotatable fairing panel 102 with only one of the first or second locking assemblies without the other present.

In some embodiments, there may be three locking assemblies, there may be four locking assemblies, or there may be some other number of locking assemblies to maintain rigidity and stiffness of the fairing panel, which may depend on the environment in which a vehicle with the rotatable fairing panel 102 is utilized. For example, the environment may be a rigorous environment such as a lumberyard, a construction site, or some other rigorous environment or emergency situation.

The rotatable fairing panel 102 is coupled to the second fairing portion 110 by a plurality of hinges 133, which hingedly and rotatably couple the rotatable fairing panel 102 to the second fairing portion 110. For example, the plurality of hinges provide a degree-of-freedom such that the rotatable fairing panel 102 can rotate outward (e.g., rotate in the clockwise direction when viewed in the top-plan view of FIG. 1B) to uncover the opening 120 such that a user can gain access to a frame of the vehicle or the rear surface 124 of the sleeper cab 100. The plurality of hinges 133 may be strap hinges, butt hinges, spring-loaded hinges, concealed hinges, piano hinges, offset hinges, overlay hinges, gooseneck hinges, or some other hinge suitable for coupling and providing a degree-of-freedom such that the rotatable fairing panel 102 rotates with respect to the second fairing portion 110.

As shown in FIG. 1E, the opening 120 is uncovered when the rotatable fairing panel 102 is in the opened position. The opening 120 is large enough such that a user can pass through the opening 120 to reach the rear surface 124, the rear end of the sleeper cab 100, or other components at the rear surface 124 and rear end of the sleeper cab 100 when a trailer is attached to the vehicle (e.g., semi-truck). For example, other components accessible may be electronics, mechanical components, access panels, or other similar or like components that are at or on the rear surface 124 that would normally be relatively difficult to access when the trailer is attached to the vehicle (e.g., semi-truck). The opening 120 provides access to a frame of the vehicle (e.g., semi-truck) even when the trailer is attached to the vehicle (e.g., semi-truck). The opening 120 provides the user with access to the electronics, the mechanical components, the access panels, the frame, and other similar or like components even when the trailer is attached the vehicle (e.g., semi-truck) allowing the user to conduct emergency maintenance or repairs even with the trailer being attached to the vehicle (e.g., semi-truck). The opening 120 provides the user with access to the frame allowing the user to more easily and quickly attach the trailer to the vehicle (e.g., semi-truck).

It will be readily appreciated that the earlier discussion with respect to FIG. 1E applies in the same or similar manner to FIG. 1F as FIG. 1F is the left-hand side view of the sleeper cab 100, which is a mirror image of the right-hand side of the sleeper cab 100 in FIG. 1E. Accordingly, for the sake of brevity and simplicity, the discussion above with respect to FIG. 1E is not reproduced herein with respect to FIG. 1F.

As shown in FIG. 1H, the first locking assembly 122 includes a first male component 122a and a first female component 122b, which can both be more clearly and readily seen in FIGS. 3A and 3C. The male component 122a is on and at the internal surface 128 of the second fairing portion 110, and the first female component 122b is on and at the inner surface 116 of the rotatable fairing panel 102. The first male component 122a is coupled to the second end of the central bracket of the plurality of brackets 126 (e.g., the bracket 126 between the first end 115, which is the lower end, and the second end 117, which is the upper end, of the second fairing portion 110 as previously discussed with respect to FIG. 1D) at and on the internal surface 128 of the second fairing portion 110. The first female component 122b is coupled to the inner surface 116 of the rotatable fairing panel 102. The first female component 122b is on the inner surface 116 of the rotatable fairing panel 102. The first female component 122b is adjacent to the ribs 134 at the inner surface 116 of the rotatable fairing panel 102. Further details of the structure and functionality of the first male component 122a and the first female component 122b will be discussed with respect to FIGS. 3A-3D as follows herein.

As shown in FIG. 1H, the second locking assembly 130 includes a second male component 130a and a second female component 130b, which can both be more clearly and readily seen in FIGS. 3B and 3D. The second male component 130a is coupled to a corresponding second end of the lowest bracket of the plurality of brackets 126 (e.g., the bracket 126 at the first end 115 of the second fairing portion 110 as discussed with respect to FIG. 1D) at and on the internal surface 128 of the second fairing portion 110. The second female component 130b is on the inner surface 116 of the rotatable fairing panel 102. The second female component 130b is adjacent to the ribs 134 at the inner surface 116 of the rotatable fairing panel 102. Further details of the structure and functionality of the second male component 130a and the second female component 130b will be discussed with respect to FIGS. 3A-3D as follows herein.

Figure 2A:
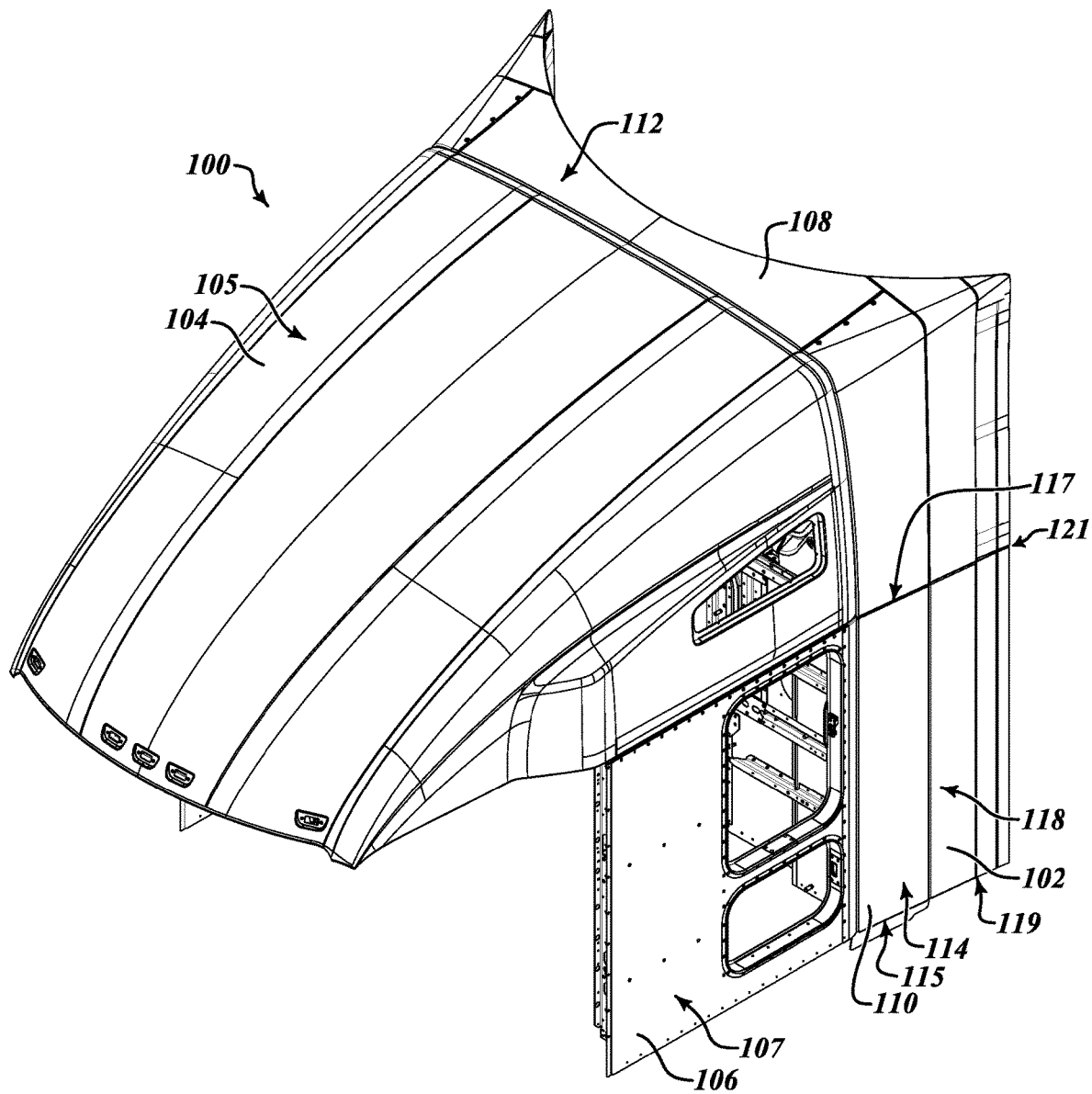
FIG. 2A is a perspective view of the sleeper cab having the embodiment of the rotatable fairing panels in the closed position.
Figure 2B:
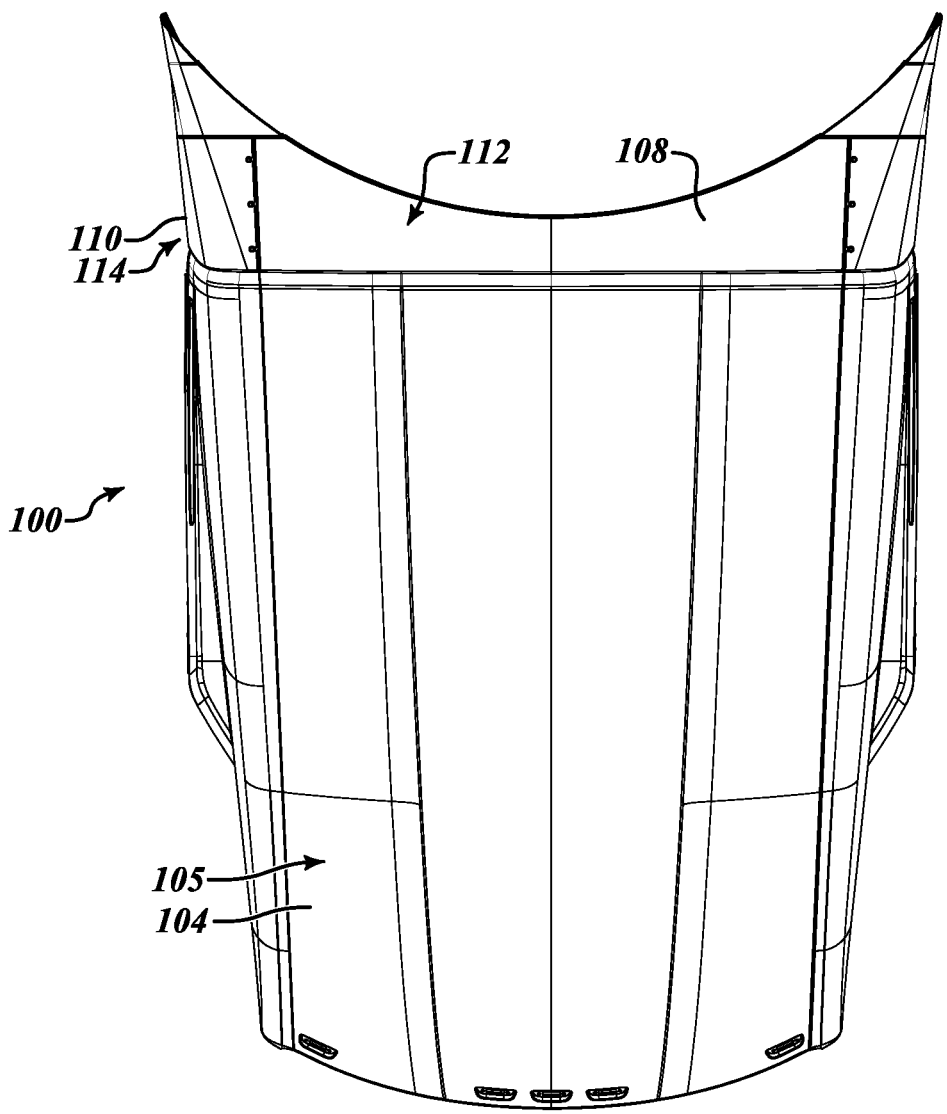
FIG. 2B is a top-plan view of the sleeper cab having the embodiment of the rotatable fairing panels in the closed position as shown in FIG. 2A.
Figure 2C:
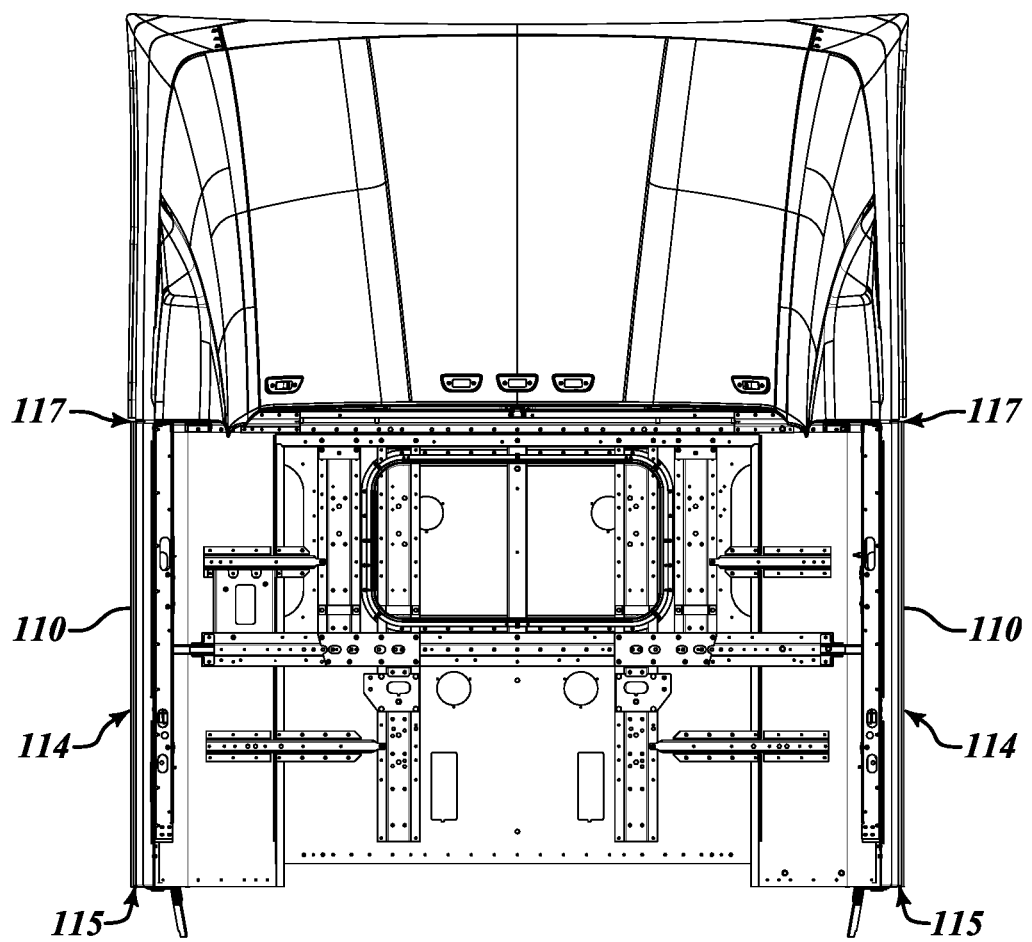
FIG. 2C is a front view of the sleeper cab having the embodiment of the rotatable fairing panels in the closed position as shown in FIGS. 2A and 2B.
Figure 2D:
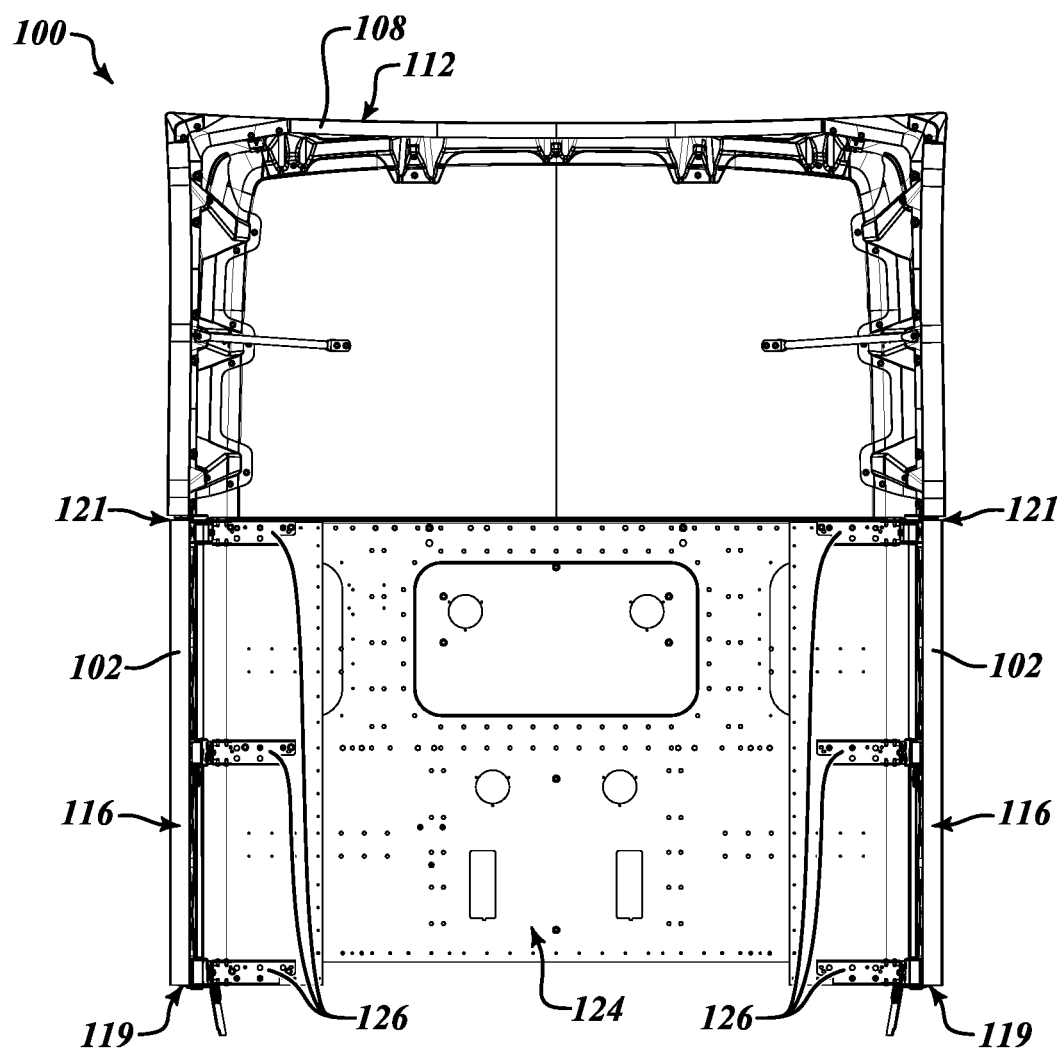
FIG. 2D is a rear view of the sleeper cab having the embodiment of the rotatable fairing panels in the closed position as shown in FIGS. 2A-2C.
Figure 2E:
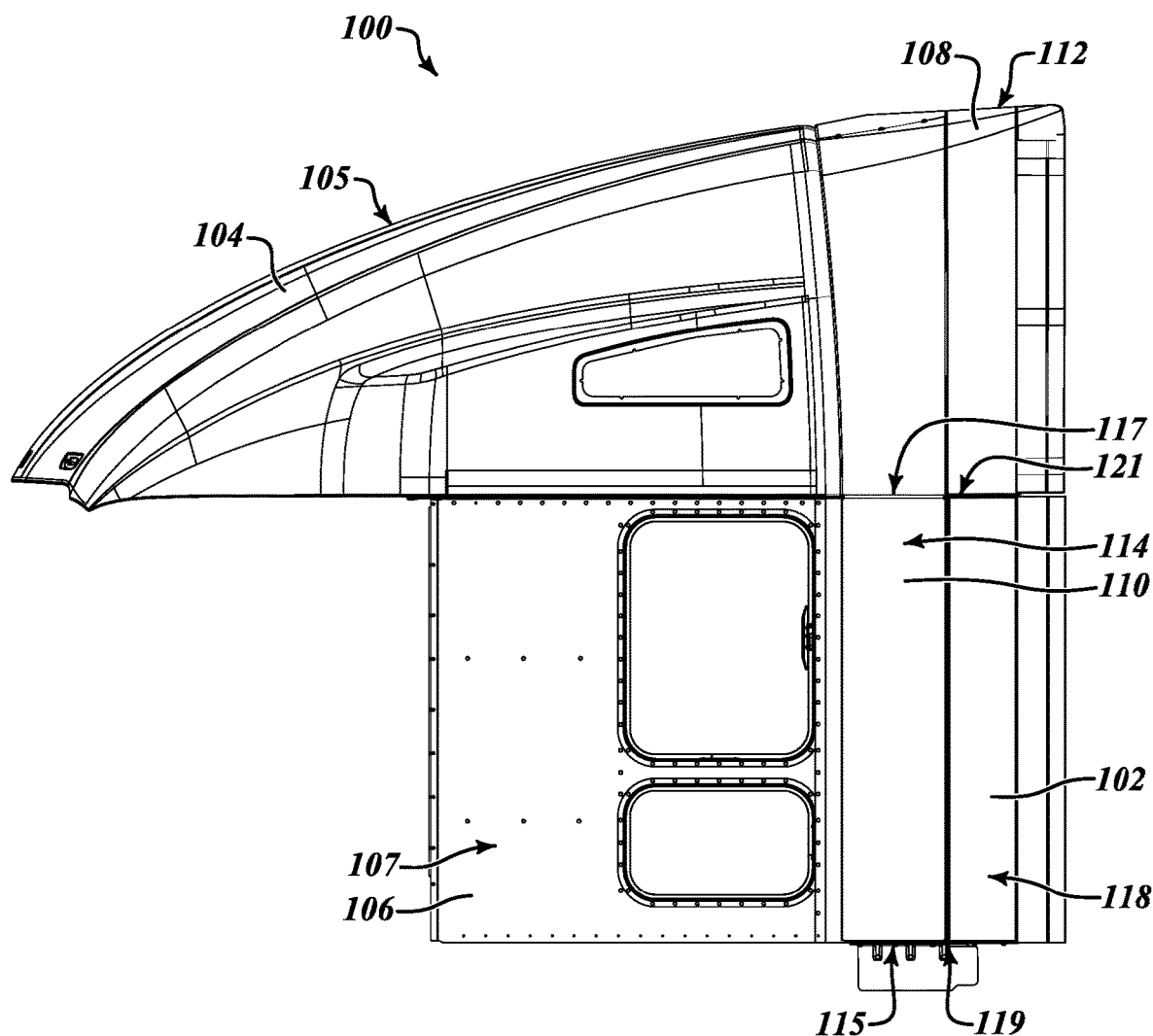
FIG. 2E is a right-side view of the sleeper cab having the embodiment of the rotatable fairing panels in the closed position as shown in FIGS. 2A-2D.
Figure 2F:
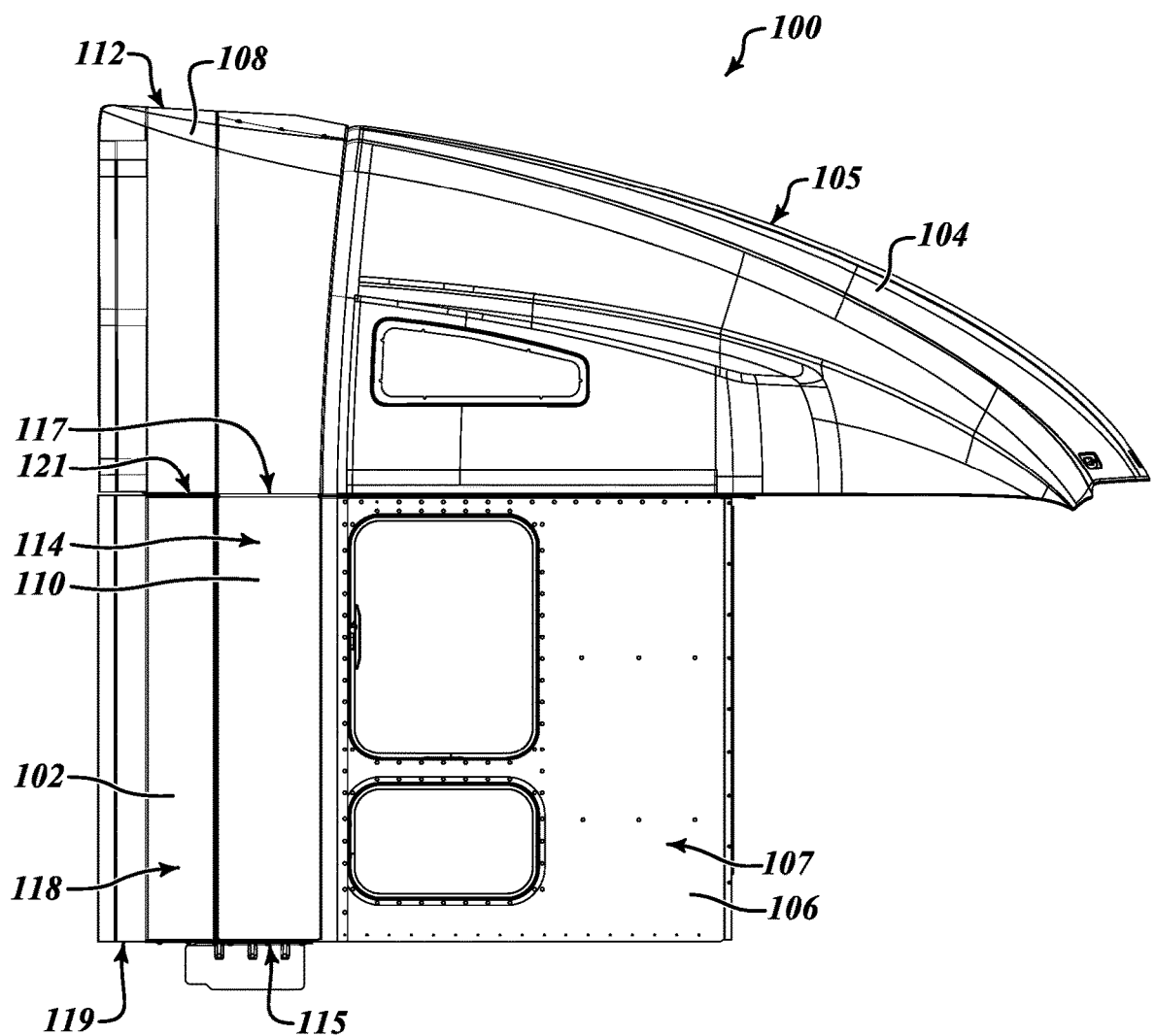
FIG. 2F is a left-side view of the sleeper cab having the embodiment of the rotatable fairing panels in the closed position as shown in FIGS. 2A-2E.
Figure 2G:
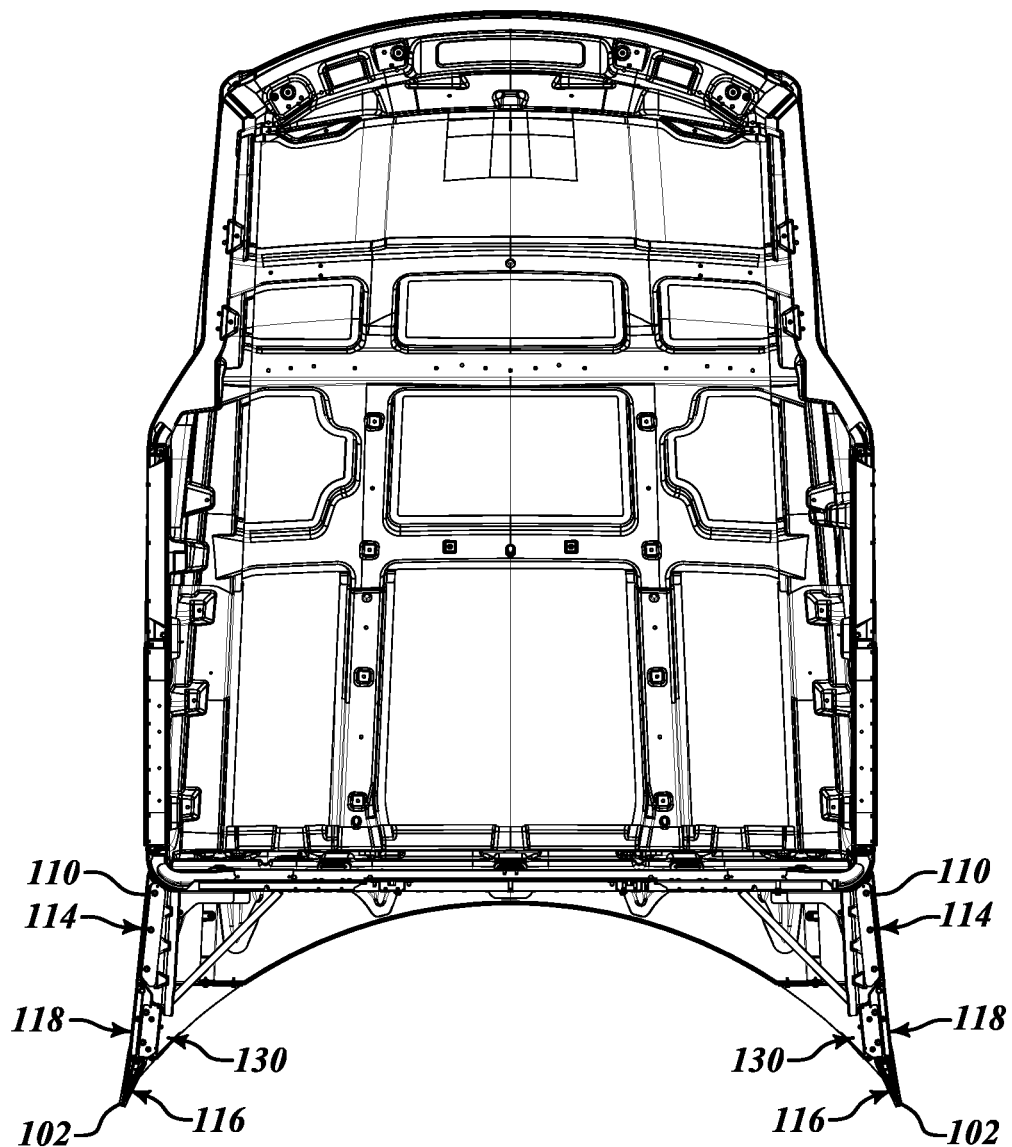
FIG. 2G is a bottom-plan view of the sleeper cab having the embodiment of the rotatable fairing panels in the closed position as shown in FIGS. 2A-2F.
Figure 2H:
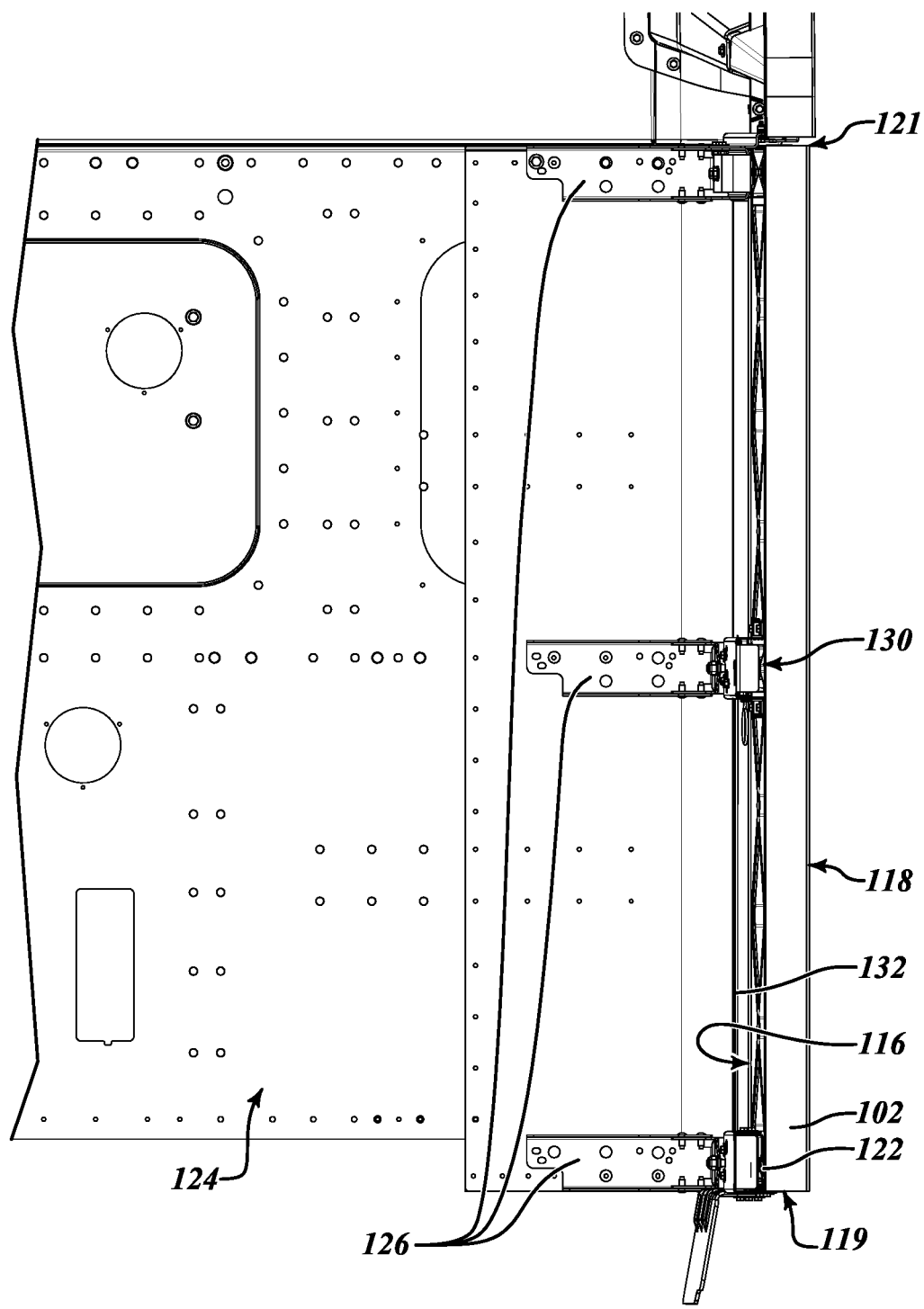
FIG. 2H is a zoomed in view of the embodiment of the rotatable fairing panel on the right-hand side of the sleeper cab in the closed position as shown in FIGS. 2A-2G.
Figure 2I:
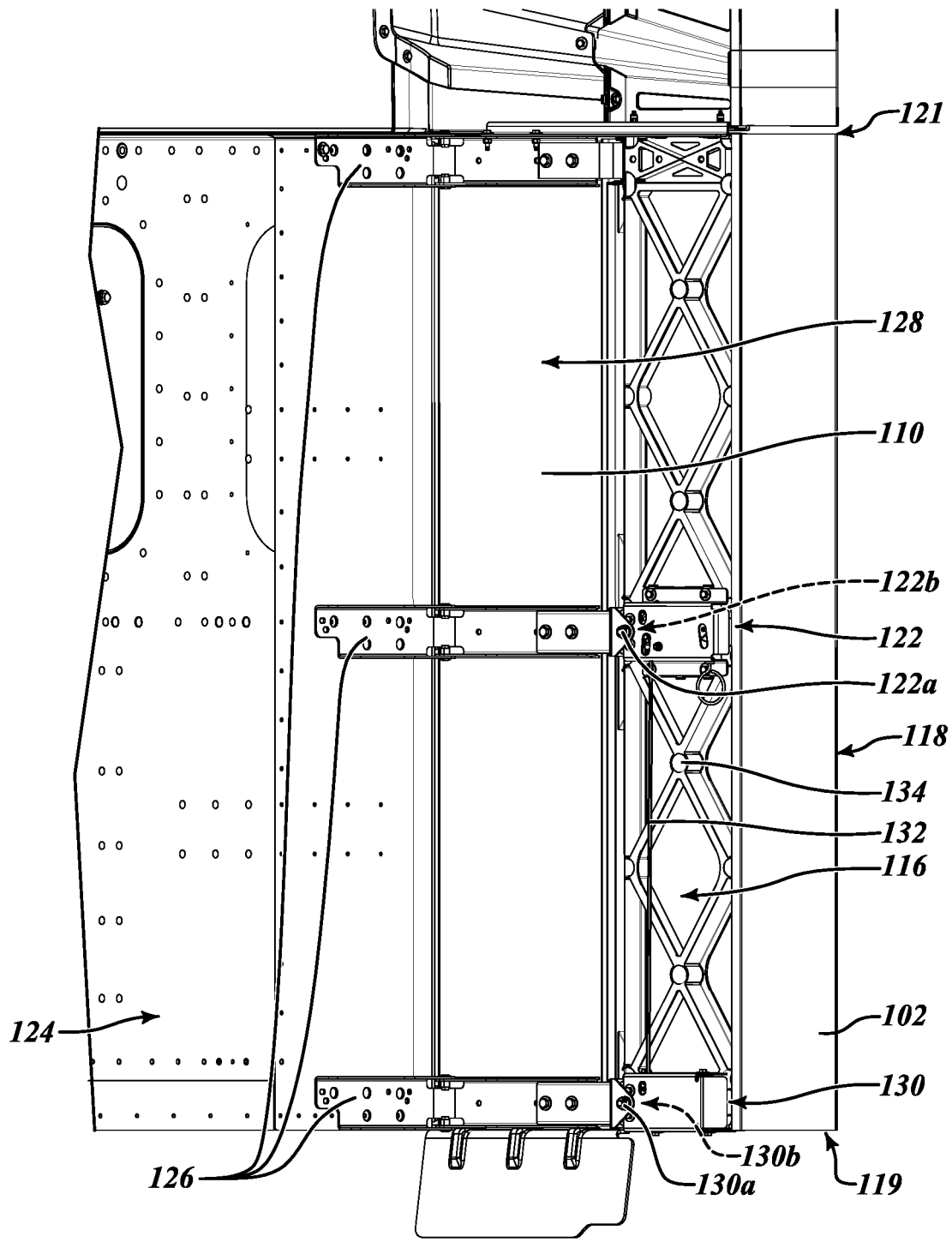
FIG. 2I is a zoomed in rotated view of the embodiment of the rotatable fairing panel on the right-hand side of the sleeper cab in the closed position as shown in FIGS. 2A-2H.

FIG. 2A is directed to a perspective view of the sleeper cab 100 of the vehicle (which is not shown) including the first (left-hand side rotatable fairing panel) and second (right-hand side rotatable fairing panel) rotatable fairing panels 102 at the rear end of the sleeper cab 100, at the right-hand side and the left-hand side of the sleeper cab 100, and in the closed position. FIG. 2B is a top-plan view of the sleeper cab 100 with the first and second rotatable fairing panels 102 in the closed position. FIG. 2C is a front view of the sleeper cab 100 with the first and second rotatable fairing panels 102 in the closed position. FIG. 2D is a rear view of the sleeper cab 100 with the first and second rotatable fairing panels 102 in the closed position. FIG. 2E is a right-side view of the sleeper cab 100 with the first and second rotatable fairing panels 102 in the closed position. FIG. 2F is a left-side view of the sleeper cab 100 with the first and second rotatable fairing panels 102 in the closed position. FIG. 2G is a bottom-plan view of the sleeper cab 100 with the first and second rotatable fairing panels 102 in the closed position. FIG. 2H is a zoomed in view of the embodiment of the second rotatable fairing panel 102 on the right-hand side of the sleeper cab 100 in FIGS. 2A-2G. FIG. 2I is a zoomed in rotated view of the embodiment of the second rotatable fairing panel 102 at the right-hand side of the sleeper cab 100 in FIGS. 2A-2G.

Unlike as shown in FIGS. 1A-1H in which the first and second rotatable fairing panels 102 on the left-hand side and the right-hand side of the sleeper cab 100 are in the opened position, in FIGS. 2A-2I, the first and second rotatable fairing panels 102 on the left-hand side and the right-hand side of the sleeper cab 100 are in the closed position.

For the sake of brevity and simplicity of the present disclosure, the discussion as follows with respect to FIGS. 2A-2I will focus on the features of the second rotatable fairing panel 102 on the right-hand side of the sleeper cab 100 as shown in FIGS. 2A-2I. However, it will be readily appreciated that the following discussion with respect to the second rotatable fairing panel 102 on the right-hand side of the sleeper cab 100 applies in the same or similar manner as the first rotatable fairing panel 102 on the left-hand side of the sleeper cab 100.

As the following discussion with respect to FIGS. 2A-2I are directed to the rotatable fairing panel 102 at the right-hand side of the sleeper cab 100 as shown and discussed with respect to FIGS. 1A-1H, for the sake of brevity and simplicity of the present disclosure, only additional features not previously discussed earlier with respect to FIGS. 1A-1H will be discussed in further detail as follows.

As shown in FIGS. 2A-2I, when the rotatable fairing panel 102 is in the closed position, the outer surface 118 of the rotatable fairing panel 102 is substantially coplanar or flush with the external surface 114 of the second fairing portion 110. When the rotatable fairing panel 102 is in the closed position, the outer surface 118 is substantially coplanar or flush with a portion of the external surface 112 of the first fairing portion 108 (e.g., the outer surface 118 is substantially coplanar and flush with a substantially vertical portion of the external surface 112 of the first fairing portion 108). When in the rotatable fairing panel 102 is in the closed position, the rotatable fairing panel 102 covers the opening 120 such that the rotatable fairing panel 102 extends from the second fairing portion 110 to a trailer (which is not shown) attached to the vehicle (which is not shown) with the sleeper cab 100. In other words, the outer surface 118 of the rotatable fairing panel 102 and the external surfaces 112, 114 of the first and second fairing portions 108, 110, respectively, define an aerodynamic surface or a plurality of aerodynamic surfaces of the sleeper cab 100 when the rotatable fairing panel 102 is in the closed position. When the vehicle with the sleeper cab 100 is being driven, the rotatable fairing panel 102 is in the closed position such that the vehicle remains aerodynamic when being driven to reduce drag and increase fuel efficiency of the vehicle.

As shown in FIG. 2I, when the rotatable fairing panel 102 is in the closed position, the first locking assembly 122 and the second locking assembly 130 are locked. For example, the first male component 122a is received by the first female component 122b locking the first locking assembly 122, and the second male component 130a is received by the second female component 130b locking the second locking assembly 130.

For a user to move or rotate the rotatable fairing panel 102 from the closed position to the opened position, the first locking assembly 122 is unlocked, and as the first locking assembly 122 is unlocked, the translating rod 132 transfers an unlocking movement to the second locking assembly 130 unlocking the second locking assembly 130. In other words, the translating rod 132 causes the first and second locking assemblies 122, 130 to unlock at the same time. After the first and second locking assemblies 122, 130 are unlocked, a degree-of-freedom is provided to the rotatable fairing panel 102 such that the user may rotate the rotatable fairing panel 102 outward from the closed position to the opened position.

Alternatively, when the user moves the rotatable fairing panel 102 from the opened position to the closed position the first and second locking assemblies 122, 130 automatically lock once the rotatable fairing panel 102 is in the closed position. A pressure is applied to the male components 122a, 130a and the female components 122b, 130b of the first and second locking assemblies 122, 130, respectively, when the user moves or rotates the rotatable fairing panel 102 from the opened position to the closed position, which causes the female components 122b, 130b to automatically receive the male components 122a, 122b, respectively, when the rotatable fairing panel 102 reaches the closed position. For example, the female components 122b, 130b may be spring female components configured to open to receive the male components 122a, 130a, respectively, and automatically interlock with the male components 122a, 130a, respectively. The male components 122a, 130a may be striker components, tab components, or some other male component suitable for being received by the female components 122b, 130b, respectively. The female components 122b, 130b may be a spring latch components, a spring opening components, a pressure latch components, or some other female components suitable for receiving the male components 122a, 130a, respectively.

FIG. 3A is directed to a zoomed in view of the first locking assembly 122 in an unlocked state when the rotatable fairing panel 102 is in the opened position. FIG. 3B is directed to a zoomed in view of the second locking assembly 130 in an unlocked state when the rotatable fairing panel 102 is in the opened position.

As shown in FIG. 3A and as discussed earlier, the first locking assembly 122 includes the first male component 122a and the second female component 122b, which is configured to receive the first male component 122a when the rotatable fairing panel 102 is in the closed position as shown in FIGS. 2A-2I. The first male component 122a is coupled to the central bracket of the plurality of brackets 126, which can be more readily seen in FIG. 3C. The first male component 122a may be coupled to the central bracket of the plurality of brackets 126 by a plurality of fasteners.

In some embodiments, the first male component 122a may be welded to the central bracket of the plurality of brackets 126. In some embodiments, the first male component 122a may be coupled to the central bracket of the plurality of brackets 126 by a combination of welding and fasteners.

As shown in FIG. 3A, the first locking assembly 122 further includes a pull component 136 that is in mechanical cooperation with the first female component 122b. When the pull component 136 is pulled outward from the first locking assembly 122, the first female component 122b is opened unlocking the first female component 122b from the first male component 122a, and the first locking assembly 122 is in an unlocked state. For example, when the pull component 136 is pulled outward a plurality of gears, articulation members, or a combination of both within the first locking assembly 122 that are in mechanical cooperation between the first female component 122b and the pull component 136 may rotate or articulate to translate the movement of the pull component 136 to the first female component 122b unlocking the first female component 122b from the first male component 122a. The pull component 136 is a pull pin component.

In some embodiments, the pull component 136 may be replaced by a lever component, a handle component, or some other suitable type of component that a user can actuate to unlock the first locking assembly 122.

As shown in FIG. 3A, the first male component 122a and the first female component 122b are coupled together by a first rotation component 122c. The first rotation component 122c provides the first locking assembly 122 with a degree-of-freedom such that the first female component 122b of the first locking assembly 122 may rotate with the rotatable fairing panel 102 when moving the rotatable fairing panel 102 from the opened position to the closed position and vice versa. The first rotation component 122c may be a pin and collar rotation component, a hinge component, or some other similar or suitable type of rotation component that provides the degree-of-freedom for the first female component 122b of the first locking assembly 122 to rotate with the rotatable fairing panel 102.

As shown in FIG. 3A, the pull component 136 is in mechanical cooperation with a first end of the translation rod 132. A second end of the translation rod 132, which is opposite to the first end of the translation rod 132, is in mechanical cooperation with the second female component 130b of the second locking assembly. When the pull component 136 is pulled outward to unlock the first locking assembly, the translation rod 132 is articulated and moved by a plurality of gears, articulation members, or a combination of both within the first locking assembly 122 that are in mechanical cooperation between the pull component 136 and the first end of the translation rod 132. When the first end of the translation rod 132 is articulated or moved when the pull component 136 is pulled, the second end of the translation rod 132 is articulated and moved, and the movement of the second end of the translation rod 132 moves and articulates a plurality of gears, articulation members, or a combination of both within the second locking assembly 130 that are in mechanical cooperation between the second end of the translation rod 132 and the second female component 130b. The movement and articulation of the plurality of gears, the articulation members, or the combination of both unlocks the second female component 130b from the second male component 130b of the second locking assembly 130. In other words, the translation rod 132 unlocks the second locking assembly 130 at the same time or concurrently with unlocking the first locking assembly 122.

The movement of the translation rod 132 may be a rotational movement, a vertical movement, a horizontal movement, or any other similar or like movement that the translation rod 132 may translate from the first locking assembly 122 to the second locking assembly 130 to unlock the second locking assembly at the same time or concurrently with unlocking the first locking assembly 122.

As shown in FIG. 3B and as discussed earlier, the second locking assembly 130 includes the second male component 130a and the second female component 130b, which is configured to receive the second male component 130a when the rotatable fairing panel 102 is in the closed position as shown in FIGS. 2A-2I. The second male component 130a is coupled to the lowest bracket of the plurality of brackets 126, which can be more readily seen in FIG. 3D. The second male component 130a is coupled to the lowest bracket of the plurality of brackets 126 by a plurality of fasteners.

In some embodiments, the second male component 130a may be welded to the lowest bracket of the plurality of brackets 126. In some embodiments, the second male component 130a may be coupled to the lowest bracket of the plurality of brackets 126 by a combination of welding and fasteners.

As shown in FIG. 3A, unlike the first locking assembly 122, the second locking assembly 130 does not include a pull component.

As shown in FIG. 3A, the second male component 130a and the second female component 130b are coupled together by a second rotation component 130c. The second rotation component 130c provides the second locking assembly 130 with a degree-of-freedom such that the second female component 130b of the second locking assembly 130 may rotate with the rotatable fairing panel 102 when moving the rotatable fairing panel 102 from the opened position to the closed position and vice versa. The second rotation component 130c may be a pin and collar rotation component, a hinge component, or some other similar or suitable type of rotation component that provides the degree-of-freedom for the second female component 130b of the second locking assembly 130 to rotate with the rotatable fairing panel 102.

For the sake of brevity and simplicity of the present disclosure, the functionality and relationship between the first locking assembly 122, the second locking assembly 130, and the translation rod 132 will not be reproduced herein as previously discussed earlier herein.

FIG. 3C is directed to a zoomed in view of the first locking assembly 122 in a locked state when the rotatable fairing panel 102 is in the closed position. FIG. 3D is directed to a zoomed in view of the second locking assembly 130 in a locked state when the rotatable fairing panel 102 is in the closed position.

As shown in FIG. 3C, the first locking assembly 122 is in the locked state in which the first male component 122a is interlocked within the first female component 122b. In other words, the first female component 122b surrounds the first male component 122a. When the rotatable fairing panel 102 is moved from the opened position to the closed position, momentum of the rotatable fairing panel 102 applied by a user causes a pressure between the first male component 122a and the first female component 122b. When the pressure is large enough due to the momentum, the first female component 122b opens and receives the first male component 122a locking the first locking assembly 122 (e.g., the locked state). In the locked state, the first male component 122a is aligned with the first female component 122b. In other words, the first locking assembly 122 automatically locks when the rotatable fairing panel 102 is moved or rotated from the opened position to the closed position. When the first male component 122a and the first female component 122b automatically interlock locking the first locking assembly 122, an auditory click is output such that a user is aware that the first male component 122a and the first female component 122b have interlocked to avoid driving the vehicle with the rotatable fairing panel 102 in the unlocked state.

As shown in FIG. 3D, the second locking assembly 130 is in a locked state in which the second male component 130a is interlocked within the second female component 130b. In other words, the second female component 130b surrounds the second male component 130a. When the rotatable fairing panel 102 is moved from the opened position to the closed position, momentum of the rotatable fairing panel 102 applied by a user causes a pressure between the second male component 130a and the second female component 130b. When the pressure is large enough due to the momentum, the second female component 130b opens and receives the second male component 130a locking the second locking assembly 130 (e.g., the locked state). In the locked state, the second male component 130a is aligned with the second female component 130b. In other words, the second locking assembly 130 automatically locks when the rotatable fairing panel 102 is moved or rotated from the opened position to the closed position. When the second male component 130a and the second female component 130b automatically interlock, an auditory click is output such that a user is aware that the second male component 130a and the second female component 130b have locked to avoid driving the vehicle with the rotatable fairing panel 102 in the opened position.

As discussed above, an embodiment of rotatable fairing panels are coupled to faring portions of a sleeper cab of a vehicle (e.g., a semi-truck or a construction vehicle) by hinges (e.g., hingedly coupled or rotatably coupled). When in the rotatable fairing panels are in the closed position, the rotatable fairing panel close off an opening between a trailer attached to the vehicle and the sleeper cab of the vehicle such that the vehicle is aerodynamic when being driven increasing a fuel efficiency of the vehicle. When the vehicle is being driven, the rotatable fairing panels are in a locked state when in the closed position such that the rotatable fairing panels do not move or rotate to the opened position maintaining the vehicle's aerodynamics. Accordingly, when the rotatable fairing panels are in the closed position, the rotatable fairing panels provide the vehicle with aerodynamics that increase the fuel efficiency of the vehicle when the vehicle is being driven.

Although the rotatable fairing panels cover the opening in the closed position for when the vehicle is being driven, when the vehicle is not being driven or operated a user (e.g., mechanic, operator, mechanic, maintenance employee, etc.), the user can easily access the opening between the trailer and the vehicle by unlocking at least one of the rotatable fairing panels. When at least one of the rotatable fairing panels is in the opened position, the user may easily and quickly access and enter the opening between the trailer attached to the vehicle and the sleeper cab of the vehicle. The user may be accessing the opening to access components on a rear surface of the sleeper cab. For example, the components may include electronics mounted on the rear surfaces, tubing along the rear surface, or some other components that may be mounted on the rear surface. Furthermore, when the rotatable fairing panel is in the opened position the user may access or enter the opening to access a frame of the vehicle between the trailer attached to the vehicle and the sleeper cab of the vehicle. For example, the user may be accessing the frame to provide emergency repairs without removing the trailer from the vehicle, accessing the frame to confirm the trailer is properly attached to the vehicle before driving, or may be access the frame for some other reason for which the user may need to access the frame of the vehicle when the trailer is attached to the vehicle. Accordingly, the user being able to access the opening between the trailer attached to the vehicle and the sleeper cab of the vehicle provides the user further flexibility and adaptability to perform emergency repairs, perform routine maintenance, examine component on the rear surface of the sleeper cab, or gain access to the frame of the vehicle when the trailer is attached to the vehicle.

The sleeper cab 100 may be a cab, a sleeping compartment, or some other similar or like compartment of a vehicle.

The first and second fairing portions 108, 110 may be fairing panels, fairing panel portions, aerodynamic portions, aerodynamic fairing portions, aerodynamic fairing panels, or some other suitable or like fairing exposed on a vehicle.

The external surfaces 105, 107, 114 may be outer surface, exterior surfaces, exposed surfaces, or some other type of surface exposed on a vehicle when being driven.

The internal surfaces 128 of the second fairing portions 110 may be inner surface, interior surfaces, unexposed surfaces, or some other suitable type of surface unexposed on a vehicle when being driven.

The rotatable fairing panels 102 may be rotatable panels, articulating panels, translation panels, aerodynamic panels, extender panels, extender portions, rotatable extender panels, rotatable extender portions, rotatable fairing portions, rotatable fairings, or some other similar or like panel externally exposed on a vehicle.

The outer surfaces 118 of the rotatable fairing panels 102 may be exterior surfaces, external surfaces, exposed surfaces, or some other suitable type of surface exposed on a vehicle when being driven.

The inner surfaces 116 of the rotatable fairing panels 102 may be interior surfaces, internal surface, unexposed surface, or some other suitable type of surface that is not exposed on a vehicle when being driven.

The first and second male components 122a, 130a may be male locking components, male portions, male locking portions, male locking members, male members, or some other similar or like male part for interlocking with a corresponding female part.

The first and second female components 122b, 130b may be female locking components, female portions, female locking portions, female locking members, female members, or some other similar or like female part for interlocking with a corresponding male part.

The first and second locking assemblies 122, 130 may be interlocking assemblies, engagement lock assemblies, engagement interlock assemblies, automatic locking assemblies, automatic interlocking assemblies, or some other suitable type of assembly that locks automatically.

The translation rod 132 may be a translation member, an articulation member, a rotation member, or some other suitable type of rod or member configured to translate a movement from the first locking assembly 122 to the second locking assembly 130 to unlock the second locking assembly 130 at the same time or concurrently with unlocking the first locking assembly 122.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle, comprising:
 a sleeper cab including a front end and a rear end opposite to the front end;
 a first fairing portion protruding from the rear end of the sleeper cab, the first fairing portion including a first external surface and a first internal surface opposite to the first external surface;
 a first fairing panel hingedly coupled to the first fairing portion, the first fairing panel having a first outer surface and a first inner surface opposite to the first outer surface, the first fairing panel moveable between:
  a first position in which the first outer surface and the first external surface define a first aerodynamic surface; and
  a second position in which the first outer surface is at an angle of relative to the first external surface; and
 at least one locking assembly associated with the first fairing panel and configured to be manually actuated to unlock the first fairing panel to be movable between the first position and the second position.

2. A vehicle, comprising:
 a sleeper cab including a front end and a rear end opposite to the front end;
 a first fairing portion protruding from the rear end of the sleeper cab, the first fairing portion including a first external surface and a first internal surface opposite to the first external surface;
 a first fairing panel hingedly coupled to the first fairing portion, the first fairing panel having a first outer surface and a first inner surface opposite to the first outer surface, the first fairing panel moveable between:
  a first position in which the first outer surface and the first external surface define a first aerodynamic surface; and
  a second position in which the first outer surface is at an angle relative to the first external surface;
 a first locking assembly including:
  a first male component on the internal surface of the first fairing portion;
  a first female component on the inner surface of the first fairing panel, the first female component configured to receive the first male component to lock the first locking assembly; and
  a pull component in mechanical cooperation with the female component, the pull component configured to unlock the first locking assembly when pulled.

3. The vehicle of claim 2, further comprising:
 a second locking assembly spaced apart from the first locking assembly, the second locking assembly including:
  a second male component on the internal surface of the first fairing portion; and
  a second female component on an inner surface of the first fairing panel, the second female component configured to receive the second male component to lock the second locking assembly;

a translation rod having a first end and a second end opposite to the first end, the first end being in mechanical cooperation with the pull component, the second end being in mechanical cooperation with the second female component, the translation rod configured to translate a movement of the pull component to unlock the second locking assembly when the first locking assembly is unlocked.

4. The vehicle of claim 3, wherein when the first fairing panel is moved from the second position to the first position, the first female component automatically couples to the first male component and the second female component automatically couples to the male component locking the first fairing panel in the second position.

5. The vehicle of claim 2, wherein when the first fairing panel is moved from the second position to the first position, the first female component automatically couples to the first male component locking the first fairing panel in the second position.

6. The vehicle of claim 2, wherein when the first locking assembly is unlocked, the first fairing panel has a degree-of-freedom that provides rotation from the first position to the second position.

7. The vehicle of claim 1, further comprising a second fairing portion protruding from the rear end of the sleeper cab, the second fairing portion being spaced apart from the first fairing portion, the second fairing portion including a second external surface and a second internal surface opposite to the second external surface.

8. A vehicle, comprising:
a sleeper cab including a front end and a rear end opposite to the front end;
a first fairing portion protruding from the rear end of the sleeper cab, the first fairing portion including a first external surface and a first internal surface opposite to the first external surface;
a second fairing portion protruding from the rear end of the sleeper cab, the second fairing portion being spaced apart from the first fairing portion, the second fairing portion including a second external surface and a second internal surface opposite to the second external surface;
a first fairing panel hingedly coupled to the first fairing portion, the first fairing panel having a first outer surface and a first inner surface opposite to the first outer surface, the first fairing panel moveable between:
a first position in which the first outer surface and the first external surface define a first aerodynamic surface; and
a second position in which the first outer surface is at an angle relative to the first external surface;
a second fairing panel hingedly coupled to the second fairing portion, the second fairing panel protruding outward from the second fairing portion, the second fairing panel having a second outer surface and a second inner surface opposite to the second outer surface, the second fairing panel including:
a third position in which the second outer surface and the second external surface define a second aerodynamic surface; and
a fourth position in which the second outer surface is at an angle relative to the second external surface.

9. The vehicle of claim 8, further comprising:
a first locking assembly on the first inner surface of the first fairing panel and the first internal surface of the first fairing portion, the first locking assembly being configured to lock the first fairing panel in the first position; and
a second locking assembly on the second inner surface of the second fairing panel and the second internal surface of the second fairing portion, the second locking assembly being configured to lock the second fairing panel in the third position.

10. The vehicle of claim 9, wherein:
the first locking assembly includes:
a first male component on the first internal surface of the first fairing portion; and
a first female component on the first inner surface of the first fairing panel, the first female component configured to receive the first male component to lock the first fairing panel in the first position;
the second locking assembly includes:
a second male component on the second internal surface of the second fairing portion; and
a second female component on the second inner surface of the second fairing panel, the second female component configured to receive the first male component to lock the first fairing panel in the third position.

11. The vehicle of claim 9, wherein:
when the first locking assembly is unlocked, the first fairing panel has a first degree-of-freedom in a first rotation direction that provides rotation from the first position to the second position; and
when the second locking assembly is unlocked, the second fairing panel has a second degree-of-freedom in a second rotation direction that provides rotation from the third position to the fourth position, the second rotation direction being opposite to the first rotation direction.

12. A vehicle, comprising:
a frame;
a cab attached to the frame, the cab including:
a front end;
a rear end opposite to the front end, the rear end spaced apart from the front end;
a first side; and
a second side opposite to the first side, the second side being spaced apart from the first side;
a first extender panel at the rear end of the cab, the first extender panel being rotatably moveable between a first closed position and a first opened position, the first extender panel being rotatable by an angle of at least 90-degrees;
a second extender panel at the rear end of the cab, the second extender panel being rotatably movable between a second closed position and a second opened position, the second extender panel being rotatable by an angle of at least 90-degrees;
at least one locking assembly associated with the first extender panel, the locking assembly configured to be manually actuated to unlock the first extender panel to be movable between the first closed position and the first open position; and
at least one locking assembly associated with the second extender panel, the locking assembly configured to be manually actuated to unlock the second extender panel to be movable between the second closed position and the second open position.

13. The vehicle of claim 12, wherein when, the first extender panel is in the first opened position, the frame and the rear end of cab are accessible to a driver or mechanic.

14. The vehicle of claim 12, wherein, when the second extender panel is in the second opened position, the frame and the rear end of the cab are accessible to a driver or mechanic.

15. A vehicle, comprising:
a frame;
a cab attached to the frame, the cab including:
  a front end;
  a rear end opposite to the front end, the rear end spaced apart from the front end;
  a first side; and
  a second side opposite to the first side, the second side being spaced apart from the first side;
a first extender panel at the rear end of the cab, the first extender panel being rotatably moveable between a first closed position and a first opened position, the first extender panel being rotatable by an angle of at least 90-degrees;
a second extender panel at the rear end of the cab, the second extender panel being rotatably movable between a second closed position and a second opened position, the second extender panel being rotatable by an angle of at least 90-degrees;
a first locking assembly coupled to a first central region of a first inner surface of the first extender panel, the first locking assembly configured to lock the first extender panel in the first closed position; and
a second locking assembly coupled to a second central region of a second inner surface of the second extender panel, the second locking assembly configured to lock the second extender panel in the second closed position.

16. The vehicle of claim 15, further comprising:
a third locking assembly coupled to a first end region of the first inner surface of the first extender panel, the third locking assembly configured to lock the first extender panel in the first closed position; and
a fourth locking assembly coupled to a second end region of the second inner surface of the second extender panel, the fourth locking assembly configured to lock the second extender panel in the second closed position.

17. The vehicle of claim 16, further comprising:
a first translation rod mechanically cooperating with the first locking assembly and the third locking assembly, the first translation rod configured to unlock the third locking assembly when the first locking assembly is unlocked; and
a second translation rod mechanically cooperating with the second locking assembly and the fourth locking assembly, the second translation rod configured to unlock the fourth locking assembly when the second locking assembly is unlocked.

18. A vehicle, comprising:
a frame;
a sleeper cab on the frame, the sleeper cab including a front end and a rear end opposite to the front end;
a fairing portion protruding from the rear end of the sleeper cab, the fairing portion having an external surface and an internal surface opposite to the external surface;
a rotatable panel rotatably coupled to the fairing portion, the rotatable panel including an outer surface and an inner surface opposite to the outer surface, the rotatable panel including a first end and a second end opposite to the first end, the rotatable panel moveable between:
  a closed position in which the outer surface and the external surface define an aerodynamic surface; and
  an opened position in which the first outer surface is at an angle of 90-degrees or less to the first external surface;
a first locking assembly including:
  a first male component on the internal surface of the fairing portion;
  a first female component on the inner surface of the rotatable panel, the female component being positioned between the first end and the second end, the female component spaced apart from the first end and the second end; and
  a pull component configured in mechanical cooperation with the female component, the pull component configured to unlock the locking assembly when pulled.

19. The vehicle of claim 18, wherein:
when the rotatable panel is in the opened position, the frame and the rear end of cab are accessible to a driver or mechanic;
when the rotatable panel is in the closed position, the female component receives the male component locking the rotatable panel in the closed position;
when moving the rotatable panel from the closed position to the opened position, the pull component is pulled articulating the female component, unlocking the locking assembly and providing a degree-of-freedom of the rotatable panel from the closed position to the opened position; and
when moving the rotatable panel, the rotatable panel is rotatable by an angle of at least 90-degrees.

20. The vehicle of claim 18, further comprising:
a second locking assembly spaced apart from the first locking assembly, the second locking assembly including:
  a second male component on the internal surface of the fairing portion; and
  a second female component on the inner surface of the rotatable panel, the female component being positioned at the second end of the rotatable panel;
a translation rod including:
  a first end in mechanical cooperation with the pull component; and
  a second end opposite to the first end, the second end being in mechanical cooperation with the second female component, the translation rod configured to translate a movement of the pull component so as to unlock the second locking assembly at the same time the first locking assembly is unlocked.

* * * * *